(12) United States Patent
Jin et al.

(10) Patent No.: US 12,426,598 B2
(45) Date of Patent: Sep. 30, 2025

(54) METHOD FOR CONTROLLING HERBICIDE-RESISTANT WEED

(71) Applicant: SUMITOMO CHEMICAL COMPANY, LIMITED, Chuo-ku (JP)

(72) Inventors: Yoshinobu Jin, Kasai (JP); Akihiro Tomita, Chuo-ku (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 727 days.

(21) Appl. No.: 17/633,729

(22) PCT Filed: Aug. 4, 2020

(86) PCT No.: PCT/JP2020/029781
§ 371 (c)(1),
(2) Date: Feb. 8, 2022

(87) PCT Pub. No.: WO2021/029273
PCT Pub. Date: Feb. 18, 2021

(65) Prior Publication Data
US 2022/0322665 A1 Oct. 13, 2022

(30) Foreign Application Priority Data
Aug. 9, 2019 (JP) .................... 2019-147166

(51) Int. Cl.
*A01N 43/54* (2006.01)
(52) U.S. Cl.
CPC .................... *A01N 43/54* (2013.01)
(58) Field of Classification Search
CPC .............. C07D 403/14; A01N 43/54
See application file for complete search history.

(56) References Cited

FOREIGN PATENT DOCUMENTS

| CA | 3025223 A1 * | 11/2017 | ............. A01N 43/40 |
|---|---|---|---|
| JP | 2019-89827 A | 6/2019 | |
| JP | 2019-516755 A | 6/2019 | |
| WO | WO 2017/202768 A1 | 11/2017 | |
| WO | WO 2017/202774 A1 | 11/2017 | |
| WO | WO 2018/019842 A1 | 2/2018 | |
| WO | WO 2018/019845 A1 | 2/2018 | |
| WO | WO 2019/101533 A1 | 5/2019 | |
| WO | WO 2019/106568 A1 | 6/2019 | |

OTHER PUBLICATIONS

International Search Report issued Oct. 13, 2020 in PCT/JP2020/029781 (submitting English translation only), 2 pages.

International Preliminary Report on Patentability and Written Opinion of the International Searching Authority issued Feb. 8, 2022 in PCT/JP2020/029781 (submitting English translation only), 5 pages.
Darci A Giacomini, et al., "Two New PPX2 Mutations Associated with Resistance to PPO-Inhibiting Herbicides in *Amaranthus palmeri*" Society of Chemical Industry, Pest Manag. Sci., vol. 73, 2017, pp. 1559-1563.

(Continued)

*Primary Examiner* — Bethany P Barham
*Assistant Examiner* — Danielle D Johnson
(74) *Attorney, Agent, or Firm* — Oblon, McClelland, Maier &Neustadt, L.L.P.

(57) ABSTRACT

Provided is a method for effectively controlling specific weeds having resistance to herbicides. The method comprises applying one or more uracil compounds selected from a group consisting of a compound represented by formula (I):

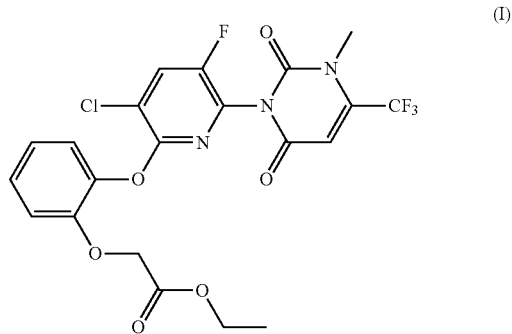

and a compound represented by formula (II):

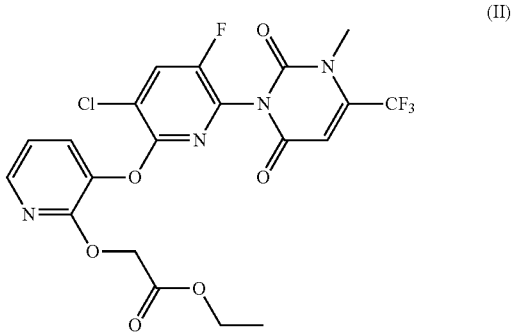

to a PPO inhibitor-resistant weed which has one or more mutations selected from a group consisting of Arg128Met mutation, Arg128Gly mutation, Arg128His mutation, Arg128Ile mutation, Arg128Lys mutation, and Gly399Ala mutation in PPO.

20 Claims, No Drawings

(56) References Cited

OTHER PUBLICATIONS

Haozhen Nie, et al., "Investigating Target-Site Resistance Mechanism to the PPO-Inhibiting Herbicide Fomesafen in Waterhemp and Interspecific Hybridization of *Amaranthus* Species Using Next Generation Sequencing" Society of Chemical Industry, Pest Manag. Sci., 2019, 10 pages.

"2018 Meeting Program" Weed Science Society of America, 2018, 68 pages.

Gulab Rangani, et al., "A Novel Single-Site Mutation in the Catalytic Domain of Protoporphyrinogen Oxidase IX (PPO) Confers Resistance to PPO-Inhibiting Herbicides" Frontiers in Plant Science, vol. 10, Article 568, May 2019, pp. 1-12.

Olivia A. Obenland, et al., "Carfentrazone-Ethyl Resistance in an *Amaranthus tuberculatus* Population is not Mediated by Amino Acid Alterations in the PPO2 Protein" PLoS One, Apr. 15, 2019, pp. 1-15.

\* cited by examiner

METHOD FOR CONTROLLING HERBICIDE-RESISTANT WEED

CROSS-REFERENCE TO RELATED APPLICATIONS

The present application is a 35 U.S.C. § 371 national stage patent application of International patent application PCT/JP2020/029781, filed on Aug. 4, 2020, which is based on and claims the benefits of priority to Japanese Application No. 2019-147166, filed on Aug. 9, 2019. The entire contents of these applications are incorporated herein by reference.

TECHNICAL FIELD

The present invention relates to a method for controlling weeds having resistance to herbicides.

BACKGROUND ART

Uracil compounds having herbicidal activity have been known as an active ingredient for PPO inhibitor. Also it has been disclosed that waterhemp having resistance to PPO inhibitors conferred by Gly210 deficiency in PPO, and common ragweed having resistance to PPO inhibitors conferred by an Arg98Leu mutation in PPO can be controlled with some types of PPO inhibitors.

CITATION LIST

Patent Document

Patent Document 1: WO 2017/202768 A1
Patent Document 2: WO 2019/101533 A1
Patent Document 3: WO 2019/106568 A1
Patent Document 4: WO 2018/019842 A1
Patent Document 5: WO 2018/019845 A1
Patent Document 6: WO 2017/202774 A1

SUMMARY OF THE INVENTION

Problems to be Solved by Invention

An object of the present invention is to provide a method for effectively controlling specific weeds having resistance to herbicides.

Means to Solve Problems

The present invention directs to a method for controlling specific weeds having resistance to PPO inhibitor by applying one or more uracil compounds selected from a group consisting of a compound represented by the following formula (I) and a compound represented by the following formula (II).

The present invention includes the following aspects.

[1] A method for controlling a herbicide-resistant weed which comprises a step of applying one or more uracil compounds selected from a group consisting of a compound represented by formula (I):

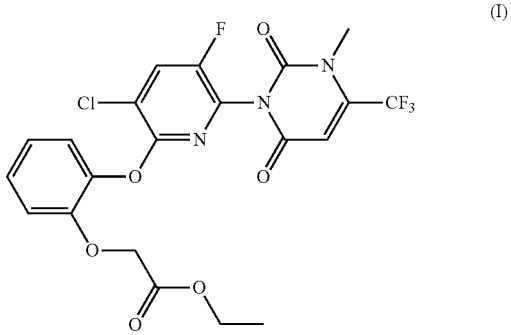 [SMILES: CCOC(=O)COc1ccccc1Oc1nc(-n2c(=O)cc(C(F)(F)F)n(C)c2=O)c(F)cc1Cl]

and a compound represented b formula (II):

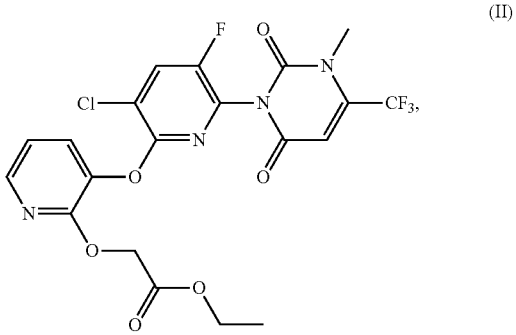 [SMILES: CCOC(=O)COc1ncccc1Oc1nc(-n2c(=O)cc(C(F)(F)F)n(C)c2=O)c(F)cc1Cl]

wherein the herbicide-resistant weed is a PPO inhibitor-resistant weed which has one or more mutations selected from a group consisting of Arg128Met mutation, Arg128Gly mutation, Arg128His mutation, Arg128Ile mutation, Arg128Lys mutation, and Gly399Ala mutation in PPO.

[2] The method according to [1], wherein the herbicide-resistant weed is palmer amaranth, waterhemp, or common ragweed.

[3] The method according to [1] or [2], wherein the method is carried out in a cultivation of crop.

[4] The method according to [3], wherein the crop is a crop selected from a group consisting of soybean, corn, cotton, rapeseed, rice, wheat, barley, sugar cane, sugar beet, sorghum, and sunflower.

[5] The method according to [3] or [4], wherein the crop is a crop which is imparted with tolerance to one or more uracil compounds selected from the group consisting of the compound represented by formula (I) and the compound represented by formula (II).

[6] The method according to any one of [1] to [5], wherein the herbicide-resistant weed has resistance to at least one compound selected from lactofen and fomesafen.

Effect of Invention

According to the method of the present invention for controlling the herbicide-resistant weeds, it becomes possible to control the specific weeds having resistance to herbicides.

MODE FOR CARRYING OUT THE INVENTION

The method of the present invention for controlling the herbicide-resistant weed comprises a step of applying one or more uracil compounds (hereinafter, referred to as "Present Uracil Compound(s)" or "Uracil Compound(s) of the Present Invention") selected from the group consisting of the compound represented by formula (I) (hereinafter, referred to as "Compound X") and the compound represented by formula (II) (hereinafter, referred to as "Compound Y") to a cultivation field of crop or a non-crop area.

As the compound X, a specific crystal form has been known to exist (see WO 2017/202768), and the crystal form is included in the compound X.

As the compound Y, four or more crystalline polymorphisms have been known to exist (see WO 2019/101533), and all of these crystalline polymorphisms and mixtures containing any two or more crystalline polymorphisms thereof are included in the compound Y.

In the case where a suspension concentrate, an oil dispersion, a wettable powder, a water dispersible granule or a granule or the like is prepared using any crystals selected from crystalline polymorphisms of the compound X or the compound Y, a volume median diameter of crystal particles is usually within a range of 0.1 to 10 μm, preferably 0.2 to 5 μm, more preferably 1 to 4 μm, and still more preferably 2 to 3 μm. Particularly preferred is a suspension concentrate in which the volume median diameter of crystal particles is 2 to 3 μm. The particle size distribution of the crystal can also be expressed based on any percentage, in addition to median (50%), and preferable range can be expressed as "volume (40%) diameter of 2.5 μm to volume (60%) diameter of 2.5 μm". Since the crystal of the compound X or the compound Y having a specified crystal structure has a specific density, it is substantially the same even if the volume median diameter is expressed by the weight median diameter, and it can also be expressed by any percentage.

In the case where the method of the present invention for controlling the herbicide-resistant weeds is carried out in cultivation of the crop, the present uracil compound may be applied in the crop field before, simultaneously with and/or after seeding crop seeds.

In the present invention, examples of the crop include soybean, corn, cotton, rapeseed, rice, wheat, barley, sugar cane, sugar beet, sorghum, and sunflower, but varieties thereof are not limited as long as they are varieties which are usually cultivated as a crop.

The plant of the variety mentioned above may be a plant which can be produced by natural hybridization, a plant which can occur as the result of a mutation, an F1 hybrid plant, or a transgenic plant (also referred to as a "genetically modified plant"). These plants generally have properties such as a property that the tolerance to herbicides is imparted, a property that a toxic substance against pests is accumulated, a property that the sensitivity to a plant disease is suppressed, a property that yield potential is increased, a property that the resistance to a biological or non-biological stress factor is improved, a property that a substance is accumulated, and improvement in a storage property or processability.

The term "F1 hybrid plant" refers to a plant of a first filial generation which is produced by hybridizing two different varieties with each other, and is generally a plant which has a more superior trait to that of either one of parents thereof, i.e., has a hybrid vigor property. The term "transgenic plant" refers to a plant which is produced by introducing a foreign gene from another organism such as a microorganism into a plant and which has a property that cannot be acquired easily by hybridization breeding, induction of a mutation or a naturally occurring recombination under a natural environment.

Examples of the technique for producing the above-mentioned plants include a conventional breeding technique, a transgenic technique, a genome-based breeding technique, a new breeding technique, and a genome editing technique. The conventional breeding technique is a technique for producing a plant having a desirable property by mutation or hybridization. The transgenic technique is a technique for imparting a new property to a specific organism (e.g., a microorganism) by isolating a gene (DNA) of interest from the organism and then introducing the gene (DNA) into the genome of another target organism, and an antisense technique or an RNA interference technique which is a technique for imparting a new or improved property to a plant by silencing another gene occurring in the plant. The genome-based breeding technique is a technique for increasing the efficiency of breeding using genomic information, and includes a DNA marker (also referred to as "genome marker" or "gene marker") breeding technique and genomic selection. For example, the DNA marker breeding is a method in which an offspring having a desired useful trait gene is selected from many hybrid offspring using a DNA marker that is a DNA sequence capable of serving as an indicator of the position of a specific useful trait gene on a genome. The analysis of a hybrid offspring of a plant at a seedling stage thereof using the DNA marker has such a characteristic that it becomes possible to shorten the time required for breeding effectively.

The genomic selection is such a technique that a prediction equation is produced from a phenotype and genomic information both obtained in advance and then a property is predicted from the prediction equation and the genomic information without carrying out the evaluation of the phenotype. The genomic selection can contribute to the increase in efficiency of breeding. A "new breeding technique" is a collective term for breeding techniques with a combination of molecular biological techniques. Examples of the new breeding technique include techniques such as cisgenesis/intragenesis, oligonucleotide-directed mutagenesis, RNA-dependent DNA methylation, genome editing, grafting to a GM rootstock or scion, reverse breeding, agroinfiltration, and seed production technology (SPT). The genome editing technique is a technique that converts genetic information in a sequence-specific manner, and enables deletion of a base sequence, substitution of an amino acid sequence, introduction of a foreign gene and the like. Examples of the tool for the technique include zinc-finger nuclease (ZFN), TALEN, CRISPR/Cas9, CRISPER/Cpf1 and meganuclease which can cleave DNA in a sequence-specific manner, and a sequence-specific genome modification technique using CAS9 nickase, Target-AID and the like which is produced by any one of the modification of the above-mentioned tools.

Examples of the above-mentioned plants include plants listed in genetically modified crops registration database (GM APPROVAL DATABASE) in an electric information site in INTERNATIONAL SERVICE for the ACQUISITION of AGRI-BIOTECH APPLICATIONS (ISAAA) (http://www.isaaa.org/). More specific examples of the plans include a herbicide-tolerant plant, a pest-resistant plant, a plant disease-resistant plant, a plant of which the quality (e.g., the increase or decrease in content or the change in composition) of a product (e.g., starch, amino acid, fatty acid, etc.) is modified, a fertility trait modified plant, a non-biological stress-tolerant plant or a plant of which a trait associated with growth or yield is modified.

Examples of plants that are imparted with tolerance to herbicides are described below.

A mechanism of tolerance to herbicides is achieved by a rapid metabolism (e.g., degradation or modification) of an agent by an expression of enzyme that inactivates the agent, which reduces an affinity of the agent to its target, or an inhibition of an uptake of agent into the plant or an inhibition of a transition of agent in the plant, or the like.

The plant imparted with tolerance to herbicides by a transgenic technique also includes plants each, by a transgenic technique, imparted with the tolerance to: a 4-hydroxyphenylpyruvate dioxygenase (abbreviated as "HPPD", hereinafter) inhibitor such as isoxaflutole and mesotrione; an acetolactate synthase (abbreviated as "ALS", hereinafter) inhibitor such as an imidazolinone-type herbicide including imazethapyr and a sulfonylurea-type herbicide including thifensulfuron-methyl; a 5-enolpyruvylshikimate-3-phosphate synthase (abbreviated as "EPSP", hereinafter) inhibitor such as glyphosate; a glutamine synthase inhibitor such as glufosinate; an auxin-type herbicide such as 2,4-D and dicamba; and an oxynil-type herbicide including bromoxynil. Preferred examples of the herbicide-tolerant transgenic plant include: a cereal such as wheat, barley, rye and oat; canola, sorghum, soybean, rice, rapeseed, sugar beet, sugarcane, grape, lentil, sunflower, alfalfa, a pomaceous fruit, a stone fruit, coffee, tea, strawberry, wheat grass, and a vegetable such as tomato, potato, cucumber and lettuce; more preferably a cereal such as wheat, barley, rye and oat, soybean, rice, vine, tomato, potato, and a pomaceous fruit.

Hereinbelow, specific examples of the herbicide-tolerant plant will be mentioned.

Plants tolerant to glyphosate herbicides; produced by introducing at least one of a glyphosate-tolerant EPSPS gene originated from *Agrobacterium tumefaciens* strain CP4 (CP4 epsps), a glyphosate-metabolizing enzyme gene in which metabolic activity is enhanced by a shuffling technique for a glyphosate-metabolizing enzyme (glyphosate N-acetyltransferase) gene originated from *Bacillus licheniformis* (gat4601, gat4621), a glyphosate-metabolizing enzyme originated from *Ochrobactrum anthropi* strain LBAA (glyphosate oxidase gene, goxv247) or an EPSP gene originated from corn and having a glyphosate tolerance mutation (mepsps, 2mepsps). Examples of the major plant include alfalfa (*Medicago sativa*), Argentina canola (*Brassica napus*), cotton (*Gossypium hirsutum* L.), creeping bentgrass (*Agrostis stolonifera*), corn (*Zea mays* L.), polish canola (*Brassica rapa*), potato (*Solanum tuberosum* L.), soybean (*Glycine max* L.), sugar beet (*Beta vulgaris*) and wheat (*Triticum aestivum*). Some of the glyphosate-tolerant transgenic plants are commercially available. For example, a genetically modified plant which expresses glyphosate-tolerant EPSPS originated from *Agrobacterium* is commercially available by trade names including the trademark of "Roundup Ready (registered trademark)"; a genetically modified plant which expresses a glyphosate-metabolizing enzyme originated from *Bacillus* in which metabolic activity is enhanced by a shuffling technique is commercially available by the trade names of "Optimum (registered trademark) GAT (trademark)", "Optimum (registered trademark) Gly canola" and the like; and a genetically modified plant which expresses EPSPS having a glyphosate tolerance mutation originated from corn is commercially available by the trademark of "GlyTol (trademark)".

Plants tolerant to glufosinate herbicides; produced by introducing at least one of a gene (bar) for phosphinothricin N-acetyltransferase (PAT) which is a glufosinate-metabolizing enzyme originated from *Streptomyces hygroscopicus*, a gene (pat) for a phosphinothricin N-acetyltransferase (PAT) enzyme which is a glufosinate-metabolizing enzyme originated from *Streptomyces viridochromogenes* or a synthetic pat gene (pat syn) originated from *Streptomyces viridochromogenes* strain Tu494. Examples of the major plant include Argentina canola (*Brassica napus*), chicory (*Cichorium intybus*), cotton (*Gossypium hirsutum* L.), corn (*Zea mays* L.), polish canola (*Brassica rapa*), rice (*Oryza sativa* L.), soybean (*Glycine max* L.) and sugar beet (*Beta vulgaris*). Some of the glufosinate-tolerant genetically modified plants are commercially available. The glufosinate-metabolizing enzyme (bar) originated from *Streptomyces hygroscopicus* and a genetically modified plant originated from *Streptomyces viridochromogenes* are commercially available by the trade names including "LibertyLink (trademark)", "InVigor (trademark)" and "WideStrike (trademark)".

Plants tolerant to oxynil-type herbicides (e.g., bromoxynil); includes transgenic plants tolerant to oxynil-type herbicides, for example, bromoxynil, into which a nitrilase gene (bxn) which is an oxynil-type herbicide (e.g., bromoxynil)-metabolizing enzyme originated from *Klebsiella pneumoniae* subsp. *Ozaenae* is introduced. Examples of the major plant include Argentina Canola (*Brassica napus*), cotton (*Gossypium hirsutum* L.) and tobacco (*Nicotiana tabacum* L.), which are commercially available by the trade names including "Navigator (trademark) canola" or "BXN (trademark)".

Plants tolerant to ALS inhibitors; carnation (*Dianthus caryophyllus*) having, introduced therein, an ALS inhibitor-tolerant ALS gene (surB) originated from tobacco (*Nicotiana tabacum*) as a selection marker is commercially available by the trade names of "Moondust (trademark)", "Moonshadow (trademark)", "Moonshade (trademark)", "Moonlite (trademark)", "Moonaqua (trademark)", "Moonvista (trademark)", "Moonique (trademark)", "Moonpearl (trademark)", "Moonberry (trademark)" and "Moonvelvet (trademark)"; lineseed (*Linum usitatissumum* L.) having, introduced therein, an ALS inhibitor-tolerant ALS gene (als) originated from mouse-ear cress (*Arabidopsis thaliana*) is commercially available by the trademark of "CDC Triffid Flax"; corn (*Zea mays* L.) having tolerance to a sulfonylurea-type herbicide and an imidazolinone-type herbicide and having, introduced therein, an ALS inhibitor-tolerant ALS gene (zm-hra) originated from corn is commercially available by the trademark of "Optimum (trademark) GAT (trademark)"; soybean having tolerance to an imidazolinone-type herbicide and having, introduced therein, an ALS inhibitor-tolerant ALS gene (csrl-2) originated from mouse-ear cress is commercially available by the trademark of "Cultivance"; and soybean having tolerance to a sulfonylurea-type herbicide and having, introduced therein, an ALS inhibitor-tolerant ALS gene (gm-hra) originated from soybean (*Glycine max*) is commercially available by the trade names of "Treus (trademark)", "Plenish (trademark)" and "Optimum GAT (trademark)". Cotton having, introduced therein, an ALS inhibitor-tolerant ALS gene (S4-HrA) originated from tobacco (*Nicotiana tabacum* cv. *Xanthi*) can also be mentioned.

Plants tolerant to HPPD inhibitors; soybean into which both a mesotrione-tolerant HPPD gene (avhppd-03) originated from oat (*Avena sativa*) and a gene (pat) for a phosphinothricin N-acetyltransferase (PAT) enzyme which is a glufosinate-metabolizing enzyme originated from *Streptomyces viridochromogenes* are introduced is commercially available by the trademark of "Herbicide-tolerant Soybean line".

Plants tolerant to 2,4-D; corn having, introduced therein, an aryloxyalkanoate dioxygenase gene (aad-1) which is a 2,4-D-metabolizing enzyme originated from *Sphingobium*

*herbicidovorans* is commercially available by the trademark of "Enlist (trademark) Maize". Soybean and cotton having, introduced therein, an aryloxyalkanoate dioxygenase gene (aad-12) which is a 2,4-D-metabolizing enzyme originated from *Delftia acidovorans* and having tolerance to 2,4-D are commercially available by the trademark of "Enlist (trademark) Soybean".

Plants tolerant to dicamba; includes soybean and cotton having, introduced therein, a dicamba monooxygenase gene (dmo) which is a dicamba-metabolizing enzyme originated from *Stenotrophomonas maltophilia* strain DI-6. Soybean (*Glycine max* L.) into which a glyphosate-tolerant EPSPS gene (CP4 epsps) originated from *Agrobacterium tumefaciens* strain CP4 is also introduced simultaneously with the above-mentioned gene is commercially available as "Genuity (registered trademark) Roundup Ready (trademark) 2 Xtend (trademark)".

Examples of a commercially available transgenic plant imparted with tolerance to herbicides include corn "Roundup Ready Corn", "Roundup Ready 2", "Agrisure GT", "Agrisure GT/CB/LL", "Agrisure GT/RW", "Agrisure 3000GT", "YieldGard VT Rootworm/RR2" and "YieldGard VT Triple" each having tolerance to glyphosate; soybean "Roundup Ready Soybean" and "Optimum GAT" each having tolerance to glyphosate; cotton "Roundup Ready Cotton" and "Roundup Ready Flex" each having tolerance to glyphosate; canola "Roundup Ready Canola" having tolerance to glyphosate; alfalfa "Roundup Ready Alfalfa" having tolerance to glyphosate and rice "Roundup Ready Rice" having tolerance to glyphosate; corn "Roundup Ready 2", "Liberty Link", "Herculex 1", "Herculex RW", "Herculex Xtra", "Agrisure GT/CB/LL", "Agrisure CB/LL/RW" and "Bt10" each having tolerance to glufosinate; cotton "FiberMax Liberty Link" having tolerance to glufosinate; rice "Liberty Link Rice" having tolerance to glufosinate; canola "in Vigor" having tolerance to glufosinate; cotton "BXN" having tolerance to bromoxynil; and canola "Navigator" and "Compass" having tolerance to bromoxynil. Other plants which are modified with respect to herbicides are also widely known, such as: alfalfa, apple, barley, eucalyptus, lineseed, grape, lentil, rapeseed, pea, potato, rice, sugar beet, sunflower, tobacco, tomato, turf grass and wheat each having tolerance to glyphosate (see, for example, U.S. Pat. Nos. 5,188,642, 4,940,835, 5,633,435, 5,804,425 and 5,627,061); bean, cotton, soybean, pea, potato, sunflower, tomato, tobacco, corn, sorghum and sugarcane each having tolerance to dicamba (see, for example, WO 2008051633, U.S. Pat. Nos. 7,105,724 and 5,670,454); soybean, sugar beet, potato, tomato and tobacco each having tolerance to glufosinate (see, for example, U.S. Pat. Nos. 6,376,754, 5,646,024 and 5,561,236); cotton, peppers, apple, tomato, sunflower, tobacco, potato, corn, cucumber, wheat, soybean, sorghum and millets each having tolerance to 2,4-D (see, for example, U.S. Pat. Nos. 6,153,401, 6,100, 446, WO 2005107437, U.S. Pat. Nos. 5,608,147 and 5,670, 454); canola, corn, barnyard millet, barley, cotton, brown mustard, lettuce, lentil, melon, foxtail millet, oat, rapeseed, potato, rice, rye, sorghum, soybean, sugar beet, sunflower, tobacco, tomato and wheat each having tolerance to an ALS inhibitor (e.g., a sulfonylurea-type herbicide and an imidazolinone-type herbicide) (see, for example, U.S. Pat. No. 5,013,659, WO 2006060634, U.S. Pat. Nos. 4,761,373, 5,304,732, 6,211,438, 6,211,439 and 6,222,100) (particularly, rice having tolerance to an imidazolinone-type herbicide; rice having a specific mutation (e.g., S653N, S654K, A122T, S653(At)N, S654 (At)K, A122(At)T) in an acetolactate synthase gene (acetohydroxyacid synthase gene) and the like (see, for example, US 2003/0217381, WO 2005/20673)); barley, sugarcane, rice, corn, tobacco, soybean, cotton, rapeseed, sugar beet, wheat and potato each having tolerance to an HPPD inhibitor (e.g., an isoxazole-type herbicide such as isoxaflutole; a triketone-type herbicide such as sulcotrione and mesotrione; a pyrazole-type herbicide such as pyrazolynate and diketonitrile that is a decomposition product of isoxaflutole (see, for example, WO 2004/055191, WO 199638567, WO 1997049816 and U.S. Pat. No. 6,791,014).

Examples of a plant that is imparted with tolerance to herbicides by a classical breeding technique or genome-based breeding technique include: rice "Clearfield Rice", wheat "Clearfield Wheat", sunflower "Clearfield Sunflower", lentil "Clearfield lentils" and canola "Clearfield canola" (a product by manufactured by BASF) each having tolerance to an imidazolinone-type ALS inhibitor such as imazethapyr and imazamox; soybean "STS soybean" having tolerance to a sulfonylurea-type ALS inhibitor such as thifensulfuron-methyl; sethoxydim-tolerant corn "SR corn" and "Poast Protected (registered trademark) corn" having tolerance to an acetyl CoA carboxylase inhibitor such as a trione oxime-type herbicide and an aryloxyphenoxypropionate-type herbicide; for example, sunflower "ExpressSun (registered trademark)" having tolerance to a sulfonylurea-type herbicide such as tribenuron; rice "Rrovisia (trademark) Rice" having tolerance to an acetyl CoA carboxylase inhibitor such as quizalofop; canola "Triazine Tolerant Canola" having tolerance to a PSII inhibitor.

An example of a plant that is imparted with tolerance to herbicides by a genome editing technique is canola "SU Canola (registered trademark)" having tolerance to a sulfonylurea-type herbicide and produced by Rapid Trait Development System (RTDS (registered trademark)). RTDS (registered trademark) corresponds to an oligonucleotide-directed mutagenesis employed in a genome editing technique, and is a technique whereby it becomes possible to introduce a mutation into a plant through Gene Repair Oligonucleotide (GRON), i.e., a DNA-RNA chimeric oligonucleotide, without needing to cleave DNA in the plant. Other examples of the plant also include: corn which is reduced in herbicide tolerance and a phytic acid content as the result of the deletion of endogenous gene IPK1 using a zinc finger nuclease (see, for example, Nature 459, 437-441 2009); and rice which is imparted with herbicide tolerance using CRISPR/Cas9 (see, for example, Rice, 7, 5 2014).

The crop tolerant to a specific PPO inhibitor in the present invention includes a crop which is imparted with ability to produce PPO with decreased affinity to the PPO inhibitor by a transgenic technique and a crop which is imparted with ability to detoxicate/decompose the PPO inhibitor by cytochrome P450 monooxygenase by a transgenic technique. The crop tolerant to a specific PPO inhibitor may be a crop which is imparted with both ability to produce PPO with decreased affinity to the PPO inhibitor and ability to detoxicate/decompose the PPO inhibitor by cytochrome P450 monooxygenase by a transgenic technique. These tolerant crops are mentioned in, for example, Patent Documents such as WO 2011085221, WO 2012080975, WO 2014030090, WO 2015022640, WO 2015022636, WO 2015022639, WO 2015092706, WO 2016203377, WO 2017198859, WO 2018019860, WO 2018022777, WO 2017112589, WO 2017087672, WO 2017039969 and WO 2017023778 and Non-Patent Document (Pest Management Science, 61, 2005, 277-285).

The technique imparting tolerance to herbicides by a new breeding technique includes a breeding technique employing grafting, and as an example of imparting a trait of a GM rootstock to a scion, soybean in which tolerance to glyphosate is imparted to a non-transgenic soybean scion using Roundup Ready (registered trademark) soybean having tolerance to glyphosate as a rootstock (see Weed Technology 27:412-416 2013) can be mentioned.

In the present invention, agrochemical active ingredients such as insecticides, nematicides, fungicides, and plant growth regulators may be applied to crop seeds. In the present invention, examples of the agrochemical active ingredients that may be applied to the crop seeds include one or more agrochemical active ingredients selected from Group A consisting of neonicotinoid-based compounds (A-1), diamide-based compounds (A-2), carbamate-based compounds (A-3), organophosphorus-based compounds (A-4), biological nematicides (A-5), other insecticide compounds and nematicide compounds (A-6), azole-based compounds (A-7), strobilurin-based compounds (A-8), metalaxyl-based compounds (A-9), SDHI compounds (A-10), plant growth regulators (A-11), and other fungicide compounds (A-12).

In the present invention, examples of the neonicotinoid-based compounds (A-1) that may be applied to the crop seeds include the following compounds:

clothianidin, imidacloprid, nitenpyram, acetamiprid, thiamethoxam, flupyradifurone, sulfoxaflor, triflumezopyrim, dicloromezotiaz, thiacloprid, and dinotefuran.

In the present invention, examples of the diamide-based compounds (A-2) that may be applied to the crop seeds include the following compounds:

flubendiamide, chlorantraniliprole, cyantraniliprole, cyclaniliprole, broflanilide, tetraniliprole, and cyhalodiamide.

In the present invention, examples of the carbamate-based compounds (A-3) that may be applied to the crop seeds include the following compounds:

aldicarb, oxamyl, thiodicarb, carbofuran, carbosulfan, and dimethoate.

In the present invention, examples of the organophosphorus-based compounds (A-4) that may be applied to the crop seeds include the following compounds:

fenamiphos, imicyafos, fensulfothion, terbufos, fosthiazate, phosphocarb, dichlofenthion, isamidofos, isazophos, ethoprophos, cadusafos, chlorpyrifos, heterofos, mecarphon, phorate, thionazin, triazophos, diamidafos, fosthietan, and phosphamidon.

In the present invention, examples of the biological nematicides (A-5) that may be applied to the crop seeds include the following proteins and microorganisms:

Harpin Protein, *Pasteuria nishizawae*, *Pasteuria penetrans*, *Pasteuria usage*, *Myrothecium verrucaria*, *Burkholderia cepacia*, *Bacillus chitonosporus*, *Paecilomyces lilacinus*, *Bacillus amyloliquefaciens*, *Bacillus firmus*, *Bacillus subtillis*, *Bacillus pumulis*, *Trichoderma harzianum*, *Hirsutella rhossiliensis*, *Hirsutella minnesotensis*, *Verticillium chlamydosporum*, and *Arthrobotrys dactyloides*.

In the present invention, examples of the other insecticide compounds and nematicide compounds (A-6) that may be applied to the crop seeds include the following compounds:

fipronil, ethiprole, beta-cyfluthrin, tefluthrin, chlorpyrifos, abamectin, spirotetramat, tioxazafen, fluazaindolizine, fluensulfone, and fluxametamide.

In the present invention, examples of the azole-based compounds (A-7) that may be applied to the crop seeds include the following compounds:

azaconazole, bitertanol, bromuconazole, cyproconazole, difenoconazole, diniconazole, epoxyconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimenol, triticonazole, fenarimol, nuarimol, pyrifenox, imazalil, oxpoconazole fumarate, pefurazoate, prochloraz, triflumizole, ipfentrifluconazole, and mefentrifluconazole.

In the present invention, examples of the strobilurin-based compounds (A-8) that may be applied to the crop seeds include the following compounds:

kresoxim-methyl, azoxystrobin, trifloxystrobin, fluoxastrobin, picoxystrobin, pyraclostrobin, dimoxystrobin, pyribencarb, metominostrobin, orysastrobin, and mandestrobin.

In the present invention, examples of the metalaxyl-based compounds (A-9) that may be applied to the crop seeds include the following compounds:

metalaxyl, and metalaxyl-M or mefenoxam.

In the present invention, examples of the SDHI compounds (A-10) that may be applied to the crop seeds include the following compounds:

sedaxane, penflufen, carboxin, boscalid, furametpyr, flutolanil, fluxapyroxad, isopyrazam, fluopyram, isofetamid, pyraziflumid, pydiflumetofen, fluindapyr, inpyrfluxam, and thifluzamide.

In the present invention, examples of the plant growth regulators (A-11) that may be applied to the crop seeds include the following compounds:

ethephon, chlormequat-chloride, mepiquat-chloride, and 4-oxo-4-(2-phenylethyl) aminobutyric acid (hereinafter, also referred to as "Compound 2".

In the present invention, examples of the other fungicide compounds (A-12) that may be applied to the crop seeds include the following compounds:

tolclophos-methyl, thiram, Captan, carbendazim, thiophanate-methyl, mancozeb, thiabendazole, isotianil, triazoxide, picarbutrazox, and oxathiapiprolin.

Each of the agrochemical active ingredients encompassed in the above-mentioned Group A is publicly known and can be synthesized according to known technical literatures, and can be also used by purchasing commercially available preparations and standard products.

In the present invention, insecticides and/or fungicides may be applied to stems and leaves of the crops in a growth period of the crops. Specifically, one or more compounds selected from Group B consisting of strobilurin-based compounds (B-1), azole-based compounds (B-2), SDHI compounds (B-3), other fungicide compounds (B-4), pyrethroid-based compounds (B-5), benzoylphenylurea compounds (B-6), organophosphorus-based insecticide compounds (B-7), neonicotinoid-based compounds (B-8), and diamide-based compounds (B-9) may be applied to the stem and leaf of crops.

In the present invention, examples of the strobilurin-based compounds (B-1) applied to the stem and leaf in the growth period of crops include the following compounds:

pyraclostrobin, azoxystrobin, mandestrobin, trifloxystrobin, and picoxystrobin.

In the present invention, examples of the azole-based compounds (B-2) applied to the stem and leaf in the growth period of crops include the following compounds:

prothioconazole, epoxiconazole, tebuconazole, cyproconazole, propiconazole, metconazole, bromuconazole, tetraconazole, triticonazole, ipfentrifluconazole, and mefentrifluconazole.

In the present invention, examples of the SDHI compounds (B-3) applied to the stem and leaf in the growth period of crops include the following compounds:
benzovindiflupyr, bixafen, fluxapyroxad, fluindapyr, and inpyrfluxam.

In the present invention, examples of the other fungicide compounds (B-4) applied to the stem and leaf in the growth period of crops include the following compounds:
tolclophos-methyl, and ethaboxam.

In the present invention, examples of the pyrethroid-based compounds (B-5) applied to the stem and leaf in the growth period of crops include the following compounds:
bifenthrin, lambda-cyhalothrin, gamma-cyhalothrin, cypermethrin, fenpropathrin, etofenprox, silafluofen, and esfenvalerate.

In the present invention, examples of the benzoylphenylurea compounds (B-6) applied to the stem and leaf in the growth period of crops include the following compounds:
teflubenzuron, and triflumuron.

In the present invention, examples of the organophosphorus-based insecticide compounds (B-7) applied to the stem and leaf in the growth period of crops include the following compounds:
acephate, and methomyl.

In the present invention, examples of the neonicotinoid-based compounds (B-8) applied to the stem and leaf in the growth period of crops include the following compounds:
imidacloprid, clothianidin, thiamethoxam, sulfoxaflor, flupyradifurone, triflumezopyrim, and dicloromezotiaz.

In the present invention, examples of the diamide-based compounds (B-9) applied to the stem and leaf in the growth period of crops include the following compounds:
flubendiamide, chlorantraniliprole, cyantraniliprole, broflanilide, tetraniliprole, and cyhalodiamide.

Each of the compounds encompassed in the above-mentioned Group B is publicly known and can be synthesized according to known technical literatures, and can be also used by purchasing commercially available preparations and standard products.

In the present invention, in the case where one or more agrochemical active ingredients selected from the above-mentioned Group A are applied to crop seeds, the agrochemical active ingredients are usually formulated by mixing with a carrier such as a solid carrier and a liquid carrier, and adding adjuvants for formulation such as surfactant as necessary. The formulation is preferably an aqueous liquid formulation such as suspension concentrate and water-based emulsion.

In the present invention, as a formulation to be applied to the crop seeds, a formulation containing one type of agrochemical active ingredient may be used alone, or a combination of two or more type of formulations each containing one type of agrochemical active ingredient may be used, or a formulation containing two or more types of agrochemical active ingredients may be used.

The amount of the agrochemical active ingredient applied to the seeds is usually within a range of 0.2 to 5,000 g, and preferably 0.5 to 1,000 g per 100 kg of seeds. Examples of the method for applying the agrochemical active ingredient to the seeds include a method of powder-coating the seeds with a formulation containing the agrochemical active ingredient, a method of immersing the seeds in a formulation containing the agrochemical active ingredient, a method of spraying a formulation containing the agrochemical active ingredient to the seeds, and a method of coating the seeds with a formulation containing the agrochemical active ingredient.

In the present invention, the present uracil compound is applied to the cultivation field before, simultaneously with and/or after seeding crop seeds.

The cultivation field of crops in the present invention may be a place where the crops are cultivated, and not particularly limited to, but examples thereof include a crop field, a paddy field, a land under perennial crops, a seedling tray, a seedling box, and a seedling place.

The crop field in the present invention may include a food crop field such as a peanut field, a soybean (indeterminate growth habit, determinate growth habit, semi-determinate growth habit) field, a corn (dent corn, flint corn, flour corn, popcorn, waxy corn, sweet corn) field and a wheat (bread wheat (soft wheat, hard wheat, medium wheat, red wheat, white wheat), durum wheat, spelt wheat, club wheat, and, winter habit and spring habit thereof) field, a barley (two-row barley, six-row barley, hulless barley, hulless waxy barley and, winter habit and spring habit thereof) field, a feed crop field such as a sorghum field and an oat field, an industrial crop field such as a cotton (upland cotton, pima cotton) field, a rapeseed field and a canola (winter habit, spring habit) field, and sugar crops field such as a sugarcane field and a sugar beet field.

The vegetable field in the present invention may include a field for cultivating solanaceae vegetables (eggplant, tomato, green pepper, chili pepper, potato, etc.), a field for cultivating cucurbitaceae vegetables (cucumber, pumpkin, zucchini, watermelon, melon, etc.), a field for cultivating cruciferous vegetables (radish, turnip, horseradish, kohlrabi, Chinese cabbage, cabbage, mustard, broccoli, cauliflower, etc.), a field for cultivating asteraceae vegetables (burdock, crown daisy, artichoke, lettuce, etc.), a field for cultivating liliaceae vegetables (welsh onion, onion, garlic, asparagus, etc.), a field for cultivating umbelliferae vegetables (carrot, parsley, celery, parsnip, etc.), a field for cultivating chenopodiaceae vegetables (spinach, beet, etc.), a field for cultivating lamiaceae vegetables (perilla, mint, basil, lavender, etc.), a strawberry field, a sweet potato field, a yam field, and an aroid field, etc.

The land under perennial crops in the present invention may include an orchard, a tea field, a mulberry field, a coffee field, a banana field, a palm field, a flowering tree farm, a flowering tree field, a planting stock field, a nursery field, a forest land, a garden, etc. The orchard tree in the present invention may include pomaceous fruits (apple, pear, Japanese pear, Chinese quince, quince, etc.), stone fruits (peach, plum, nectarine, Japanese apricot, yellow peach, apricot, prune, etc.), citrus fruits (citrus unshiu, orange, lemon, lime, grapefruit, etc.), nut trees (chestnut, walnut, hazelnut, almond, pistachio, cashew nut, macadamia nut, etc.), berry fruits (grape, blueberry, cranberry, blackberry, raspberry, etc.), persimmon, olive, loquat, etc.

The non-crop area in the present invention may include an athletic field, an empty lot, a railroad edge, a park, a parking area, a road edge, a dry riverbed, under power lines, a building land, a factory site, etc.

The present uracil compounds are publicly known compounds and can be produced by the method described in literatures such as WO 2017/202768.

The present uracil compound used in the present invention is usually formulated by mixing with a carrier such as a solid carrier and a liquid carrier, and adding adjuvants for formulation such as surfactant as necessary. The formulation type is preferably a suspension concentrate, an oil dispersion, a wettable powder, a water dispersible granule, a granule, a water-based emulsion, an oil-based emulsion, and an emulsifiable concentrate, and more preferably an emulsifiable concentrate. It may be possible to use alone a composition containing the present uracil compound solely as an agrochemical active ingredient, or use the composition in admixture with any formulations containing other herbicides. Further, it may also be possible to use a composition containing the present uracil compound and other herbicides as agrochemical active ingredients, or use the composition in admixture with any formulations containing other herbicides.

The method for applying the present uracil compound include, for example, a method of spraying the present uracil compound on the soil of a cultivation field, and a method of spraying the present uracil compound to weeds grown. Spraying the present uracil compound is usually performed by spraying a spray liquid obtained by mixing the formulation containing the present uracil compound with water, using a spraying machine. The spray liquid amount is not particularly limited and is usually within a range of 50 to 1,000 L/ha, preferably 100 to 500 L/ha, and more preferably 150 to 300 L/ha.

The application rate of the present uracil compound is usually within a range of 1 to 1,000 g per 10,000 $m^2$, preferably 2 to 500 g per 10,000 $m^2$, more preferably 5 to 200 g per 10,000 $m^2$, and still more preferably 10 to 100 g per 10,000 $m^2$. Further, in a step of applying the present uracil compound, the present uracil compound may be mixed with an adjuvant and the mixture may be applied.

The type of the adjuvant is not particularly limited, and examples of the adjuvant include oil-based adjuvants such as Agri-Dex and MSO, nonionic adjuvants (ester or ether of polyoxyethylene) such as Induce, anionic adjuvants (substituted sulfonate) such as Gramin S, cationic adjuvants (polyoxyethylene amine) such as Genamin T 200BM, and organosilicon-based adjuvants such as Silwett L77.

When the present uracil compound is applied, the pH and hardness of the spray liquid to be used are not particularly limited, and the pH is usually within a range of 5 to 9 and the hardness is usually within a range of 0 to 500 ppm as American hardness.

The period of time for applying the present uracil compound is not particularly limited, and the period of time is usually within a range of 5 a.m. to 9 p.m. and the photon flux density is usually within a range of 10 to 2,500 $\mu mol/m^2/second$.

The spraying pressure to be employed for the application of the present uracil compound is not particularly limited, and is usually within a range of 30 to 120 PSI, and preferably 40 to 80 PSI.

In the present method, the type of the nozzle to be used in the application of the present uracil compound may be a flat fan nozzle or a drift-reducing nozzle. Examples of the flat fan nozzle include products of Teejet 110 series and XR Teejet 110 series manufactured by Teejet. The volume median diameter of liquid droplets ejected through each of the nozzles is usually smaller than 430 microns at an ordinary spraying pressure, usually 30 to 120 PSI. A drift-reducing nozzle is a nozzle reduced in drift compared with a flat fan nozzle and is called as “air induction nozzle” or “pre-orifice nozzle”. The volume median diameter of liquid droplets ejected through the drift-reducing nozzle is usually 430 microns or larger.

An air induction nozzle has an air guide part between an inlet (spray liquid introduction part) of the nozzle and an outlet (spray liquid ejection part) of the nozzle, so that liquid droplets filled with air can be formed upon the mixing the spray liquid with air. Examples of the air induction nozzle include: TDXL11003-D, TDXL11004-D1, TDXL11005-D1 and TDXL11006-D manufactured by Green Leaf Technology; TTI110025, TTI11003, TTI11004, TTI11005, TTI11006 and TTI11008 manufactured by Teejet; and ULD120-041, ULD120-051 and ULD120-061 manufactured by Pentair. A particularly desirable one is TTI11004.

A pre-orifice nozzle is a nozzle in which an inlet (a spray liquid introduction part) of the nozzle serves as a metering orifice, so that large liquid droplets can be formed by controlling the flow amount to be flown into the nozzle so as to decrease the pressure in the nozzle. When the pre-orifice nozzle is used, the pressure during the ejection of the spray liquid can be reduced by half compared with the pressure before the introduction of the spray liquid. Examples of the pre-orifice nozzle include: DR110-10, UR110-05, UR110-06, UR110-08 and UR110-10 manufactured by Wilger; and 1/4TTJ08 Turf Jet and 1/4TTJ04 Turf Jet manufactured by Teejet.

In the present invention, the crop seeds are seeded in a cultivation field by a usual method. The method of the present invention for controlling the herbicide-resistant weeds comprises a step of applying the uracil compound before, simultaneously with and/or after seeding crop seeds. That is, the number of the treatments with the present uracil compound may include once before, simultaneously with, or after seeding crop seeds; twice except before seeding crop seeds, twice except simultaneously with seeding crop seeds, or twice except after seeding crop seeds; or three times at all timings of before seeding crop seeds, simultaneously with seeding crop seeds, and after seeding crop seeds.

In the case where the present uracil compound is applied before seeding crop seeds, the present uracil compound is applied from 50 days before seeding to immediately before seeding, preferably from 30 days before seeding to immediately before seeding, more preferably from 20 days before seeding to immediately before seeding, and still more preferably from 10 days before seeding to immediately before seeding.

In the case where the present uracil compound is applied after seeding crop seeds, the present uracil compound is applied usually from immediately after seeding to before flowering. The present uracil compound is applied more preferably from immediately after seeding to before sprouting, or from 1 to 6 leaf stages of crops. In the case where the present uracil compound is applied to stem and leaf in 1 to 6 leaf stages of crops, the present uracil compound may be used in admixture with one or more compounds selected from the above Group B, or an application of the present uracil compound to stem and leaf may be performed sequentially before or after an application of one or more compounds selected from the above Group B to stem and leaf. In the case of sequential application, the order of application of the present uracil compound and application of one or more compounds selected from the above Group B is not particularly limited.

The case where the present uracil compound is applied simultaneously with seeding the crop seeds is the case where a sowing machine and a spraying machine are integrated with each other.

In the present invention, in the case where one or more compounds selected from the above Group B are applied to the stem and leaf in crops, the compounds are usually formulated by mixing with a carrier such as a solid carrier and a liquid carrier, and adding adjuvants for formulation such as surfactant as necessary. The formulation type is preferably an emulsifiable concentrate, a suspension concentrate, and a soluble liquid.

In the present invention, in the case where one or more compounds selected from the above Group B are applied to the stem and leaf in growth period of crops, the one or more compounds selected from the above Group B are applied from 10 days after seeding to 120 days after seeding, and preferably from 21 days after seeding to 90 days after seeding. In the case where a plural of compounds selected from the above Group B are applied, a plural of formulations each containing one compound may be used, and in that case, the formulations are used in admixture with each other, or the formulations are applied sequentially. Further, a mixed formulation containing a plural of compounds may be used.

The application rate of one or more compounds selected from the above Group B is usually within a range of 5 to 5,000 g per 10,000 m$^2$, preferably 20 to 2,000 g per 10,000 m$^2$, and more preferably 500 to 1,500 g per 10,000 m$^2$. Further, in the case where one or more compounds selected from the above Group B are applied, the one or more compounds selected from the above Group B may be mixed with an adjuvant and the mixture may be applied.

Specific examples of the type of weeds which can be a subject controlled by the present invention include the following weeds, but are not limited thereto.

Urticaceae weeds: small nettle (*Urtica urens*),

Polygonaceae weeds: black bindweed (*Polygonum convolvulus*), pale persicaria (*Polygonum lapathifolium*), Pennsylvania smartweed (*Polygonum pensylvanicum*), redshank (*Polygonum persicaria*), bristly lady's-thumb (*Polygonum longisetum*), knotgrass (*Polygonum aviculare*), equal-leaved knotgrass (*Polygonum arenastrum*), Japanese knotweed (*Polygonum cuspidatum*), Japanese dock (*Rumex japonicus*), curly dock (*Rumex crispus*), blunt-leaved dock (*Rumex obtusifolius*), and common sorrel (*Rumex acetosa*), Portulacaceae weeds: common purslane (*Portulaca oleracea*), Caryophyllaceae weeds: common chickweed (*Stellaria media*), water chickweed (*Stellaria aquatica*), common mouse-ear (*Cerastium holosteoides*), sticky mouse-ear (*Cerastium glomeratum*), corn spurrey (*Spergula arvensis*), and five-wound catchfly (*Silene gallica*), Molluginaceae weeds: carpetweed (*Mollugo verticillata*), Chenopodiaceae weeds: common lambsquarters (*Chenopodium album*), Indian goosefoot (*Chenopodium ambrosioides*), kochia (*Kochia scoparia*), spiny saltwort (*Salsola kali*), and Orach (*Atriplex* spp.), Amaranthaceae weeds: redroot pigweed (*Amaranthus retroflexus*), slender amaranth (*Amaranthus viridis*), livid amaranth (*Amaranthus lividus*), spiny amaranth (*Amaranthus spinosus*), smooth pigweed (*Amaranthus hybridus*), Palmer amaranth (*Amaranthus palmeri*), green pigweed (*Amaranthus patulus*), waterhemp (*Amaranthus tuberculatus=Amaranthus rudis=Amaranthus tamariscinus*), prostrate pigweed (*Amaranthus blitoides*), large-fruit amaranth (*Amaranthus deflexus*), mucronate amaranth (*Amaranthus quitensis*), alligator weed (*Alternanthera philoxeroides*), sessile alligator weed (*Alternanthera sessilis*), and perrotleaf (*Alternanthera tenella*), Papaveraceae weeds: common poppy (*Papaver rhoeas*), field poppy (*Papaver dubium*), and Mexican prickle poppy (*Argemone mexicana*), Brassicaceae weeds: wild radish (*Raphanus raphanistrum*), radish (*Raphanus sativus*), wild mustard (*Sinapis arvensis*), shepherd's purse (*Capsella bursa-pastoris*), white mustard (*Brassica juncea*), oilseed rape (*Brassica napus*), pinnate tansy mustard (*Descurainia pinnata*), marsh yellowcress (*Rorippa islandica*), yellow fieldcress (*Rorippa sylvestris*), field pennycress (*Thlaspi arvense*), turnip weed (*Myagrum rugosum*), Virginia pepperweed (*Lepidium virginicum*), and slender wartcress (*Coronopus* didymus), Capparaceae weeds: African cabbage (*Cleome affinis*), Fabaceae weeds: Indian joint vetch (*Aeschynomene indica*), zigzag joint vetch (*Aeschynomene rudis*), hemp sesbania (*Sesbania exaltata*), sickle pod (*Cassia obtusifolia*), coffee senna (*Cassia occidentalis*), Florida beggar weed (*Desmodium tortuosum*), wild groundnut (*Desmodium adscendens*), Illinois tick trefoil (*Desmodium illinoense*), white clover (*Trifolium repens*), kudzu (*Pueraria lobata*), narrowleaf vetch (*Vicia angustifolia*), hairy indigo (*Indigofera hirsuta*), *Indigofera truxillensis*, and common cowpea (*Vigna sinensis*), Oxalidaceae weeds: creeping wood sorrel (*Oxalis corniculata*), European wood sorrel (*Oxalis stricta*), and purple shamrock (*Oxalis oxyptera*), Geraniaceae weeds: Carolina geranium (*Geranium carolinense*), and common storksbill (*Erodium cicutarium*), Euphorbiaceae weeds: sun spurge (*Euphorbia helioscopia*), annual spurge (*Euphorbia maculata*), prostrate spurge (*Euphorbia humistrata*), Hungarian spurge (*Euphorbia esula*), wild poinsettia (*Euphorbia heterophylla*), hyssop-leaf sandmat (*Euphorbia brasiliensis*), Asian copperleaf (*Acalypha australis*), tropic croton (*Croton glandulosus*), lobed croton (*Croton lobatus*), long-stalked phyllanthus (*Phyllanthus corcovadensis*), and castor bean (*Ricinus communis*), Malvaceae weeds: velvetleaf (*Abutilon theophrasti*), arrow-leaf sida (*Sida rhombifolia*), heart-leaf sida (*Sida cordifolia*), prickly sida (*Sida spinosa*), *Sida glaziovii*, *Sida santaremnensis*, bladder weed (*Hibiscus trionum*), spurred anoda (*Anoda cristata*), and spine-seeded falsemallow (*Malvastrum coromandelianum*), Onagraceae weeds: *Ludwigia epilobioides*, long-fruited primrose willow (*Ludwigia octovalvis*), winged water primrose (*Ludwigia decurrens*), common evening-primrose (*Oenothera biennis*), and cutleaf evening-primrose (*Oenothera laciniata*), Sterculiaceae weeds: Florida waltheria (*Waltheria indica*), Violaceae weeds: field violet; *Viola arvensis*, wild violet; *Viola tricolor*, Cucurbitaceae weeds: bur cucumber (*Sicyos angulatus*), wild cucumber (*Echinocystis lobata*), and bitter balsam apple (*Momordica charantia*), Lythraceae weeds: *Ammannia multiflora*, eared redstem (*Ammannia auriculata*), scarlet toothcup (*Ammannia coccinea*), purple loosestrife (*Lythrum salicaria*), and Indian toothcup (*Rotala indica*), Elatinaceae weeds: three-stamen waterwort (*Elatine triandra*), and California waterwort (*Elatine californica*), Apiaceae weeds: Chinese celery (*Oenanthe javanica*), wild carrot (*Daucus carota*), carrot fern (*Conium maculatum*), Araliaceae weeds: lawn pennywort (*Hydrocotyle sibthorpioides*), and floating pennywort (*Hydrocotyle ranunculoides*), Ceratophyllaceae weeds: common hornwort (*Ceratophyllum demersum*), Cabombaceae weeds: Carolina fanwort (*Cabomba caroliniana*), Haloragaceae weeds: Brazilian water milfoil (*Myriophyllum aquaticum*), whorled water milfoil (*Myriophyllum verticillatum*), and water milfoils (*Myriophyllum spicatum, Myriophyllum heterophyllum*, etc.), Sapindaceae weeds: heartseed (*Cardiospermum halicacabum*), Primulaceae weeds: scarlet pimpernel (*Anagallis arvensis*), Asclepiadaceae weeds: common milkweed (*Asclepias syriaca*), and honeyvine milkweed (*Ampelamus albidus*), Rubiaceae weeds: catchweed bedstraw (*Galium aparine*), *Galium spurium* var. *echinospermon*, broadleaf buttonweed (*Spermacoce latifolia*), Brazil calla lily (*Richardia brasiliensis*), and broadleaf buttonweed (*Borreria alata*), Convolvulaceae weeds: Japanese morning glory (*Ipomoea nil*), ivy-leaf morning glory (*Ipomoea hederacea*), tall morning glory (*Ipomoea purpurea*), entire-leaf morning glory (*Ipomoea hederacea* var. *integriuscula*), pitted morning glory (*Ipomoea lacunosa*), three-lobe morning glory (*Ipomoea triloba*), blue morning glory (*Ipomoea acuminata*), scarlet morning glory (*Ipomoea hederifolia*), red morning glory (*Ipomoea coccinea*), cypress-vine morning glory (*Ipomoea quamoclit*), *Ipomoea grandifolia, Ipomoea aristolochiaefolia*, Cairo morning glory (*Ipomoea cairica*), field bindweed (*Convolvulus arvensis*), Japanese false bindweed (*Calystegia hederacea*), Japanese bindweed (*Calystegia japonica*), ivy woodrose (*Merremia hederacea*), hairy woodrose (*Merremia aegyptia*), roadside woodrose (*Merremia cissoides*), and small-flower morning glory (*Jacquemontia tamnifolia*), Boraginaceae weeds: field forget-me-not (*Myosotis arvensis*), Lamiaceae weeds: purple deadnettle (*Lamium purpureum*), common henbit (*Lamium amplexicaule*), lion's ear (*Leonotis nepetaefolia*), wild spikenard (*Hyptis suaveolens*), *Hyptis* lophanta, Siberian motherwort (*Leonurus sibiricus*), and field-nettle betony (*Stachys arvensis*), Solanaceae weeds: jimsonweed (*Datura stramonium*), black nightshade (*Solanum nigrum*), American black nightshade (*Solanum americanum*), eastern black nightshade (*Solanum ptycanthum*), hairy nightshade (*Solanum sarrachoides*), buffalo bur (*Solanum rostratum*), soda-apple nightshade (*Solanum aculeatissimum*), sticky nightshade (*Solanum sisymbriifolium*), horse nettle (*Solanum carolinense*), cutleaf groundcherry (*Physalis angulata*), smooth groundcherry (*Physalis subglabrata*), and apple of Peru (*Nicandra physalodes*), Scrophulariaceae weeds: ivyleaf speedwell (*Veronica hederaefolia*), common speedwell (*Veronica persica*), corn speedwell (*Veronica arvensis*), common false pimpernel (*Lindernia procumbens*), false pimpernel (*Lindernia dubia*), *Lindernia angustifolia*, round-leaf water hyssop (*Bacopa rotundifolia*), dopatrium (*Dopatrium junceum*), and *Gratiola japonica*, Plantaginaceae weeds: Asiatic plantain (*Plantago asiatica*), narrow-leaved plantain (*Plantago lanceolata*), broadleaf plantain (*Plantago major*), and marsh water starwort (*Callitriche palustris*), Asteraceae weeds: common cocklebur (*Xanthium pensylvanicum*), large cocklebur (*Xanthium occidentale*), Canada cocklebur (*Xanthium italicum*), common sunflower (*Helianthus annuus*), wild chamomile (*Matricaria chamomilla*), scentless chamomile (*Matricaria perforata*), corn marigold (*Chrysanthemum segetum*), rayless mayweed (*Matricaria matricarioides*), Japanese mugwort (*Artemisia princeps*), common mugwort (*Artemisia vulgaris*), Chinese mugwort (*Artemisia verlotorum*), tall goldenrod (*Solidago altissima*), common dandelion (*Taraxacum officinale*), hairy galinsoga (*Galinsoga ciliata*), small-flower galinsoga (*Galinsoga parviflora*), common groundsel (*Senecio vulgaris*), flower-of-souls (*Senecio brasiliensis*), *Senecio grisebachii*, fleabane (*Conyza bonariensis*), Guernsey fleabane (*Conyza sumatrensis*), marestail (*Conyza canadensis*), common ragweed (*Ambrosia artemisiifolia*), giant ragweed (*Ambrosia trifida*), three-cleft burmarigold (*Bidens tripartita*), hairy beggarticks (*Bidens pilosa*), common beggarticks (*Bidens frondosa*), greater beggarticks (*Bidens subalternans*), Canada thistle (*Cirsium arvense*), black thistle (*Cirsium vulgare*), blessed milkthistle (*Silybum marianum*), musk thistle (*Carduus nutans*), prickly lettuce (*Lactuca serriola*), annual sowthistle (*Sonchus oleraceus*), spiny sowthistle (*Sonchus asper*), beach creeping oxeye (*Wedelia glauca*), perfoliate blackfoot (*Melampodium perfoliatum*), red tasselflower (*Emilia sonchifolia*), wild marigold (*Tagetes minuta*), para cress (*Blainvillea latifolia*), coat buttons (*Tridax procumbens*), Bolivian coriander (*Porophyllum ruderale*), Paraguay starbur (*Acanthospermum australe*), bristly starbur (*Acanthospermum hispidum*), balloon vine (*Cardiospermum halicacabum*), tropic ageratum (*Ageratum conyzoides*), common boneset (*Eupatorium perfoliatum*), fireweed (*Erechtites hieracifolia*), American cudweed (*Gamochaeta spicata*), linear-leaf cudweed (*Gnaphalium spicatum*), *Jaegeria hirta*, ragweed parthenium (*Parthenium hysterophorus*), small yellow crownbeard (*Siegesbeckia orientalis*), lawn burweed (*Soliva sessilis*), white eclipta (*Eclipta prostrata*), American false daisy (*Eclipta alba*), and spreading sneezeweed (*Centipeda minima*), Alismataceae weeds: dwarf arrowhead (*Sagittaria pygmaea*), threeleaf arrowhead (*Sagittaria trifolia*), arrowhead (*Sagittaria sagittifolia*), giant arrowhead (*Sagittaria montevidensis*), *Sagittaria aginashi*, channelled water plantain (*Alisma canaliculatum*), and common water plantain (*Alisma plantago-aquatica*), Limnocharitaceae weeds: Sawah flowering rush (*Limnocharis flava*), Hydrocharitaceae weeds: American frogbit (*Limnobium spongia*), Florida elodea (*Hydrilla verticillata*), and common water nymph (*Najas guadalupensis*), Araceae weeds: Nile cabbage (*Pistia stratiotes*), Lemnaceae weeds: three-nerved duckweed (*Lemna aoukikusa, Lemna paucicostata, Lemna aequinoctialis*), common duckmeat (*Spirodela polyrhiza*), and *Wolffia* spp., Potamogetonaceae weeds: roundleaf pondweed (*Potamogeton distinctus*), and pondweeds (*Potamogeton crispus, Potamogeton illinoensis, Stuckenia pectinata*, etc.), Liliaceae weeds: wild onion (*Allium canadense*), wild garlic (*Allium vineale*), and Chinese garlic (*Allium macrostemon*), Pontederiaceae weeds: common water hyacinth (*Eichhornia crassipes*), blue mud plantain (*Heteranthera* limosa), *Monochoria korsakowii*, and heartshape false pickerelweed (*Monochoria vaginalis*), Commelinaceae weeds: common dayflower (*Commelina communis*), tropical spiderwort (*Commelina benghalensis*), erect dayflower (*Commelina erecta*), and Asian spiderwort (*Murdannia keisak*), Poaceae weeds: common barnyardgrass (*Echinochloa crus-galli*), early barnyardgrass (*Echinochloa oryzicola*), barnyard grass (*Echinochloa crus-galli* var *formosensis*), late watergrass (*Echinochloa oryzoides*), jungle rice (*Echinochloa colonum*), Gulf cockspur (*Echinochloa crus-pavonis*), green foxtail (*Setaria viridis*), giant foxtail (*Setaria faberi*), yellow foxtail (*Setaria glauca*), knotroot foxtail (*Setaria geniculata*), southern crabgrass (*Digitaria ciliaris*), large crabgrass (*Digitaria sanguinalis*), Jamaican crabgrass (*Digitaria horizontalis*), sourgrass (*Digitaria insularis*), goosegrass (*Eleusine indica*), annual bluegrass (*Poa annua*), rough-stalked meadowgrass (*Poa trivialis*), Kentucky bluegrass (*Poa pratensis*), short-awn foxtail (*Alopecurus aequalis*), blackgrass (*Alopecurus myosuroides*), wild oat (*Avena fatua*), Johnsongrass (*Sorghum halepense*), shataken (grain sorghum; *Sorghum vulgare*), quackgrass (*Agropyron repens*), Italian ryegrass (*Lolium multiflorum*), perennial ryegrass (*Lolium perenne*), bomugi (rigid ryegrass; *Lolium rigidum*), rescue brome (*Bromus catharticus*), downy brome (*Bromus tectorum*), Japanese brome grass (*Bromus japonicus*), cheat (*Bromus secalinus*), cheatgrass (*Bromus tectorum*), foxtail barley (*Hordeum jubatum*), jointed goatgrass (*Aegilops cylindrica*), reed canarygrass (*Phalaris arundinacea*), little-seed canary grass (*Phalaris minor*), silky bentgrass (*Apera spica-venti*), fall panicum (*Panicum dichotomiflorum*), Texas panicum (*Panicum texanum*), guineagrass (*Panicum maximum*), broadleaf signalgrass (*Brachiaria platyphylla*), Congo signal grass (*Brachiaria ruziziensis*), Alexander grass (*Brachiaria plantaginea*), Surinam grass (*Brachiaria decumbens*), palisade grass (*Brachiaria brizantha*), creeping signalgrass (*Brachiaria humidicola*), southern sandbur (*Cenchrus echinatus*), field sandbur (*Cenchrus pauciflorus*), woolly cupgrass (*Eriochloa villosa*), feathery pennisetum (*Pennisetum setosum*), Rhodes grass (*Chloris gayana*), feathertop Rhodes grass (*Chloris virgata*), India lovegrass (*Eragrostis pilosa*), Natal grass (*Rhynchelytrum repens*), crowfoot grass (*Dactyloctenium aegyptium*), winkle grass (*Ischaemum rugosum*), swamp millet (*Isachne globosa*), common rice (*Oryza sativa*), bahiagrass (*Paspalum notatum*), coastal sand paspalum (*Paspalum maritimum*), mercergrass (*Paspalum distichum*), kikuyugrass (*Pennisetum clandestinum*), West Indies pennisetum (*Pennisetum setosum*), itch grass (*Rottboellia cochinchinensis*), Asian sprangletop (*Leptochloa chinensis*), salt-meadow grass (*Leptochloa fascicularis*), Christmas-tree grass (*Leptochloa filiformis*), Amazon sprangletop (*Leptochloa panicoides*), Japanese cutgrass (*Leersia japonica*), *Leersia sayanuka*, cutgrass (*Leersia oryzoides*), *Glyceria leptorrhiza*, sharpscale mannagrass (*Glyceria acutiflora*), great watergrass (*Glyceria maxima*), redtop (*Agrostis gigantea*), carpet bent (*Agrostis stolonifera*), Bermuda grass (*Cynodon dactylon*), cocksfoot (*Dactylis gloomerata*), centipede grass (*Eremochloa ophiuroides*), tall fescue (*Festuca arundinacea*), red fescue (*Festuca rubra*), lalang (*Imperata cylindrica*), Chinese fairy grass (*Miscanthus sinensis*), switchgrass (*Panicum virgatum*), and Japanese lawngrass (*Zoysia japonica*), Cyperaceae weeds: Asian flatsedge (*Cyperus microiria*), rice flatsedge (*Cyperus iria*), hedgehog cyperus (*Cyperus compressus*), small-flowered nutsedge (*Cyperus difformis*), lax-flat sedge (*Cyperus flaccidus*), *Cyperus globosus, Cyperus nipponicus*, fragrant flatsedge (*Cyperus odoratus*), mountain nutsedge (*Cyperus serotinus*), purple nutsedge (*Cyperus rotundus*), yellow nutsedge (*Cyperus esculentus*), pasture spike sedge (*Kyllinga gracillima*), green kyllinga (*Kyllinga brevifolia*), grasslike fimbristylis (*Fimbristylis miliacea*), annual fringerush (*Fimbristylis dichotoma*), slender spikerush (*Eleocharis acicularis*), *Eleocharis kuroguwai*, Japanese bulrush (*Schoenoplectiella hotarui*), hardstem bulrush (*Schoenoplectiella juncoides*), *Schoenoplectiella wallichii*, rough-seed bulrush (*Schoenoplectiella mucronatus*), *Schoenoplectiella triangulatus, Schoenoplectiella nipponicus*, triangular club-rush (*Schoenoplectiella triqueter*), *Bolboschoenus koshevnikovii*, and river bulrush (*Bolboschoenus fluviatilis*), Equisetaceae weeds: field horsetail (*Equisetum arvense*), and marsh horsetail (*Equisetum palustre*), Salviniaceae weeds: floating fern (*Salvinia natans*), Azollaceae weeds: Japanese mosquitofern (*Azolla japonica*), and feathered mosquito fern (*Azolla pinnata*), Marsileaceae weeds: clover fern (*Marsilea quadrifolia*), Other: Filamentous algae (*Pithophora, Cladophora*), Bryophyta, Marchantiophyta, Anthocerotophyta, Cyanobacteria, Pteridophyta, and sucker of perennial crop (pome fruits, stone fruits, berry fruits, nuts, citrus fruits, hops, grapes, etc.).

In the present invention, a PPO inhibitor-resistant weed as a controlled subject has one or more mutations selected from the group consisting of Arg128Met mutation, Arg128Gly mutation, Arg128His mutation, Arg128Ile mutation, Arg128Lys mutation, and Gly399Ala mutation (all of amino acid numbers are standardized by sequence of PPO2 of palmer amaranth (*Amaranthus palmeri*)) in PPO as target site mutation (hereinafter, also referred to as "present target site mutation"). The above PPO inhibitor-resistant weed is known as a weed that has resistance to carfentrazone-ethyl, fomesafen or lactofen. PPO means protoporphyrinogen oxidase. PPO in a weed includes PPO1 and PPO2. The abovementioned mutation may occur in either PPO1 or PPO2, or may also occur in both of PPO1 and PPO2. The present invention is preferable for a method for controlling the PPO inhibitor-resistant weeds which has the mutation in PPO2.

For example, Arg128Met mutation means that a mutation occurs in an amino acid residue located at position-128. Examples of the PPO inhibitor-resistant weeds are shown below. Palmer amaranth (*Amaranthus palmeri*) having an Arg128Met mutation in PPO2 is known (Pest Management Science 73, 1559-1563). Palmer amaranth (*Amaranthus palmeri*) having an Arg128Gly mutation in PPO2 is known (Pest Management Science 73, 1559-1563). Waterhemp (*Amaranthus tuberculatus=Amaranthus rudis=Amaranthus tamariscinus*) having an Arg128Gly mutation in PPO2 is known (Pest Management Science, doi: 10.1002/ps.5445). Waterhemp (*Amaranthus tuberculatus=Amaranthus rudis=Amaranthus tamariscinus*) having an Arg128Ile mutation in PPO2 and waterhemp (*Amaranthus tuberculatus=Amaranthus rudis=Amaranthus tamariscinus*) having an Arg128Lys mutation in PPO2 are respectively known (Pest Management Science, doi: 10.1002/ ps.5445). Rigid ryegrass (*Lolium rigidum*) having a mutation corresponding to Arg128His in PPO2 (rigid ryegrass (*Lolium rigidum*) having an Arg132His mutation in PPO2) is known (WSSA annual meeting, 2018). Palmer amaranth (*Amaranthus palmeri*) having a Gly399Ala mutation in PPO2 is known (Frontiers in Plant Science 10, Article 568). Goosegrass (*Eleusine indica*) having a mutation corresponding to Ala210Thr in PPO1 (goosegrass (*Eleusine indica*) having an Ala212Thr mutation in PPO1) is known (WSSA annual meeting, 2019). According to the present invention, PPO inhibitor-resistant weeds each having one of the above-mentioned target site mutations can be controlled effectively. However, the PPO inhibitor-resistant weeds to be controlled is not limited to these weeds. Namely, not only palmer amaranth (*Amaranthus palmeri*) having the present target site mutation in either PPO1 or PPO2 or both of them can be controlled effectively, but also, for example, waterhemp (*Amaranthus tuberculatus*=*Amaranthus rudis*=*Amaranthus tamariscinus*) having the present target site mutation, common ragweed (*Ambrosia artemisiifolia*) having the present target site mutation, rigid ryegrass (*Lolium rigidum*) having the present target site mutation, Italian ryegrass (*Lolium multiflorum*) having the present target site mutation and wild poinsettia (*Euphorbia cyathophora*) having the present target site mutation can be controlled effectively.

The above PPO inhibitor-resistant weeds to be controlled by the present invention may have resistance to PPO inhibitors due to non-target site mutation. Examples of the reduced sensitivity of weeds due to non-target site mutation include waterhemp (*Amaranthus tuberculatus*=*Amaranthus rudis*=*Amaranthus tamariscinus*) and palmer amaranth (*Amaranthus palmeri*) which become resistant to a PPO inhibitor as the result of the involvement of CYP or GST, and specifically, for example, waterhemp (*Amaranthus tuberculatus*=*Amaranthus rudis*=*Amaranthus tamariscinus*) which becomes resistant to carfentrazone-ethyl is known (PLOS ONE, doi: 10.1371/journal.pone.0215431). Even if the above PPO inhibitor-resistant weeds have resistance to herbicides due to non-target site mutation, the weeds are effectively controlled according to the present invention.

In the present invention, the above PPO inhibitor-resistant weeds can be controlled by applying the present uracil compound in the cultivation field in crops. Here, the above PPO inhibitor-resistant weeds are not those having resistance to the present uracil compound to be applied. In the above PPO inhibitor-resistant weeds, with respect to traits other than resistance to PPO inhibitors, any mutations within the species are not particularly limited. Namely, the weeds may have both traits of reduced sensitivity and resistance to a particular herbicide other than PPO inhibitors. The reduced sensitivity and resistance may be attributed to target site mutation where mutation occurs at a target site, or may be attributed to non-target site mutation.

Examples of the non-target site mutation include metabolic enhancement, defective absorption, defective transition, efflux out of the system and the like. Examples of the factor of the metabolic enhancement include enhanced activity of metabolic enzymes such as cytochrome P450 monooxygenases, aryl acylamidases, esterases and glutathione S-transferase. The efflux out of the system includes the transportation to a vacuole by an ABC transporter.

Examples of the target site mutation include the substitution of one amino acid residue or multiple amino acid residues selected from the below-mentioned amino acid residues in ALS gene.

Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Arg377His, Trp574Leu, Trp574Gly, Trp574Met, Ser653Thr, Ser653Thr, Ser653Asn, Ser635Ile, Gly654Glu and Gly645Asp.

Examples of the reduced sensitivity of weeds due to target site mutation include reduced sensitivity due to the substitution of one amino acid residue or multiple amino acid residues selected from the below-mentioned amino acid residues in ACCase gene.

Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg and Gly2096Ala.

Similarly, examples of the reduced sensitivity of weeds due to target site mutation include the substitution of amino acid residues such as Thr102Ile, Pro106Ser, Pro106Ala, Pro106Leu and Pro106Thr in EPSPS gene. Particularly, those with substitution of amino acid residues of both of Thr102Ile and Pro106Ser, and those with substitution of amino acid residues of both of Thr102Ile and Pro106Thr are mentioned. Even if glyphosate-resistant goosegrass, Italian ryegrass, rigid ryegrass, perennial ryegrass, sourgrass, waterhemp, *Bidens subalternans*, jungle rice and the like each having substitution of one amino acid residue or multiple amino acid residues among the above-mentioned amino acid residues have further the present target site mutation in PPO, they can be controlled effectively. Similarly, examples of the reduced sensitivity of weeds due to target site mutation include an increased number of copies of EPSPS gene, and thus glyphosate-resistant palmer amaranth, waterhemp, summer cypress and the like can also be controlled effectively, even if they have further the present target site mutation in PPO as described above. Glyphosate-resistant Canadian horseweed, Sumatran fleabane and flaxleaf fleabane in which an ABC transporter is involved can also be controlled effectively, even if they have further the present target site mutation in PPO. Further, as an example of the reduced sensitivity of weeds due to non-target site mutation, jungle rice in which sensitivity to glyphosate is reduced by increasing expression of aldo-keto reductase is known (Plant Physiology 181, 1519-1534), and such jungle rice can be effectively controlled, even if it has further the present target site mutation in PPO.

In the present invention, in the case where the present uracil compound is applied, one or more other herbicides, plant growth regulators and/or safeners can be used in combination with the present uracil compound. Here, the combination use may be any one of use in admixture (tank mix), use of mixed formulation (premix), and sequential application. In the case of sequential application, the order of application is not particularly limited.

Examples of the above-mentioned herbicides, plant growth regulators and safeners include the following compounds.

Herbicides: 2,3,6-TBA (2,3,6-trichlorobenzoic acid), 2,3, 6-TBA-dimethylammonium, 2,3,6-TBA-lithium, 2,3,6-TBA-potassium, 2,3,6-TBA-sodium, 2,4-D, 2,4-D choline salt, 2,4-D BAPMA salt (2,4-D N,N-bis(3-aminopropyl) methylamine salt), 2,4-D-2-butoxypropyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine, 2,4-D-dodecylammonium, 2,4-D-ethyl, 2,4-D-heptylammonium, 2,4-D-isobutyl, 2,4-D-isooctyl, 2,4-D-isopropyl, 2,4-D-isopropylammonium, 2,4-D-lithium, 2,4-D-mepty, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris (2-hydroxypropyl) ammonium, 2,4-D-trolamine, 2,4-DB, 2,4-DB choline salt, 2,4-DB BAPMA salt (2,4-DB N,N-bis(3-aminopropyl)methylamine salt), 2,4-DB-butyl, 2,4-DB-dimethylammonium, 2,4-DB-isoctyl, 2,4-DB-potassium, 2,4-DB-sodium, acetochlor, acifluorfen, acifluorfen-sodium, aclonifen, ACN (2-amino-3-chloronaphthalene-1,4-dione), alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium, aminopyralid-tris(2-hydroxypropyl)ammonium, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialafos, bialaphos, bicyclopyrone, bifenox, bispyribac, bispyribac-sodium, bixlozone, bromacil, bromobutide, bromofenoxim, bromoxynil, bromoxyniloctanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine, clopyralid-potassium, clopyralid-tris(2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, di-allate, dicamba, dicamba choline salt, dicamba BAPMA salt (dicamba N,N-bis(3-aminopropyl)methylamine salt, dicamba-trolamine, dicamba-diglycolamine, dicamba-dimethylammonium, dicamba-diolamine, dicamba-isopropylammonium, dicamba-methyl, dicamba-olamine, dicamba-potassium, dicamba-sodium, dichlobenil, dichlorprop, dichlorprop choline salt, dichlorprop BAPMA salt (dichlorprop N,N-bis(3-aminopropyl)methylamine salt), dichlorprop-2-ethylhexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P BAPMA salt (dichlorprop-P N,N-bis(3-aminopropyl)methylamine salt), dichlorprop-P-2-ethylhexyl, dichlorprop-P-dimethylammonium, dichlorprop-potassium, dichlorprop-sodium, diclofop, diclofop-methyl, diclosulam, difenoxuron, difenzoquat, diflufenican, diflufenzopyr, diflufenzopyr-sodium, dimefuron, dimepiperate, dimethachlor, dimethametryn, dimethenamid, dimethenamid-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol), esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium, flucetosulfuron, flufenacet, flufenpyr, flufenpyr-ethyl, flumetsulam, flumetsulam, flumioxazin, flumiclorac, flumiclorac-pentyl, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P, glufosinate-P-ammonium, glufosinate-P-sodium, glyphosate, glyphosate choline salt, glyphosate guanidine derivative salts, glyphosate isopropylamine salt, glyphosate BAPMA salt (glyphosate N,N-bis(3-aminopropyl)methylamine salt), glyphosate-ammonium, glyphosate-diammonium, glyphosate-potassium, glyphosate-sodium, glyphosate-trimethylsulfonium, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-ammonium, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic hydrazide, MCPA (2-(4-chloro-2-methylphenoxy)acetic acid), MCPA choline salt, MCPA BAPMA salt (MCPA N,N-bis(3-aminopropyl)methylamine salt), MCPA-2-ethylhexyl, MCPA-butotyl, MCPA-butyl, MCPA-dimethylammonium, MCPA-diolamine, MCPA-ethyl, MCPA-isobutyl, MCPA-isoctyl, MCPA-isopropyl, MCPA-methyl, MCPA-olamine, MCPA-sodium, MCPA-trolamine, MCPB (4-(4-chloro-2-methylphenoxy)butanoic acid), MCPB choline salt, MCPB BAPMA salt (MCPB N,N-bis(3-aminopropyl)methylamine salt), MCPB-ethyl, MCPB-methyl, MCPB-sodium, mecoprop, mecoprop choline salt, mecoprop BAPMA salt (mecoprop N,N-bis(3-aminopropyl)methylamine salt), mecoprop-2-ethylhexyl, mecoprop-dimethylammonium, mecoprop-diolamine, mecoprop-ethadyl, mecoprop-isoctyl, mecoprop-methyl, mecoprop-potassium, mecoprop-sodium, mecoprop-trolamine, mecoprop-P, mecoprop-P choline salt, mecoprop-P-2-ethylhexyl, mecoprop-P-dimethylammonium, mecoprop-P-isobutyl, mecoprop-P-potassium, mefenacet, mesosulfuron, mesosulfuron-methyl, mesotrione, metam, metamifop, metamitron, metazachlor, metazosulfuron, methabenzthiazuron, methiozolin, methyl-daymuron, metobromuron, metolachlor, metosulam, metoxuron, metribuzin, metsulfuron, metsulfuron-methyl, molinate, monolinuron, napropanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, saflufenacil, sethoxydim, EPTC (S-ethyl N,N-dipropylcarbamothioate), siduron, simazine, simetryn, S-metolachlor, MSMA (sodium hydrogen methylarsonate), sulcotrione, sulfentrazone, sulfometuron, sulfometuron-methyl, sulfosulfuron, swep, TCA (2,2,2-trichloroacetic acid, tebutam, tebuthiuron, tefuryltrione, tembotrione, tepraloxydim, terbacil, terbumeton, terbuthylazine, terbutryn, tetflupyrolimet, thaxtomin A, thenylchlor, thiazopyr, thidiazimin, thiencarbazone, thiencarbazone-methyl, thifensulfuron, thifensulfuron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifludimoxazin, trifluralin, triflusulfuron, triflusulfuron-methyl, tritosulfuron, vernolate, and Ethyl [(3-{2-chloro-4-fluoro-5-[3-methyl-4-(trifluoromethyl)-2,6-dioxo-1,2,3,6-tetrahydropyrimidin-1-yl]phenoxy}pyridin-2-yl)oxy]acetate (353292-31-6).

Safeners: allidochlor, benoxacor, cloquintocet, cloquintocet-mexyl, cyometrinil, cyprosulfamide, dichlormid, dicyclonone, dimepiperate, disulfoton, daiymuron, fenchlorazole, fenchlorazole-ethyl, fenclorim, flurazole, furilazole, fluxofenim, hexim, isoxadifen, isoxadifen-ethyl, mecoprop, mefenpyr, mefenpyr-ethyl, mefenpyr-diethyl, mephenate, metcamifen, oxabetrinil, 1,8-naphthalic anhydride, 1,8-octamethylene diamine, AD-67 (4-(dichloroacetyl)-1-oxa-4-azaspiro[4.5]decane), MCPA (2-(4-chloro-2-methylphenoxy) acetic acid), CL-304415 (4-carboxy-3,4-dihydro-2H-1-benzopyran-4-acetic acid), CSB (1-bromo-4-[(chloromethyl)sulfonyl]benzene), DKA-24 (2,2-dichloro-N-[2-oxo-2-(2-propenylamino)ethyl]-N-(2-propenyl)acetamide), MG191 (2-(dichloromethyl)-2-methyl-1,3-dioxolane), MG-838 (2-propenyl 1-oxa-4-azaspiro[4.5]decane-4-carbodithioate), PPG-1292 (2,2-dichloro-N-(1,3-dioxan-2-ylmethyl)-N-(2-propenyl)acetamide), R-28725 (3-(dichloroacetyl)-2,2-dimethyl-1,3-oxazolidine), R-29148 (3-(dichloroacetyl)-2,2,5-trimethyl-1,3-oxazolidine), and TI-35 (1-(dichloroacetyl)azepane).

Plant growth regulators: hymexazol, paclobutrazol, uniconazole, uniconazole-P, inabenfide, prohexadione-calcium, 1-methylcyclopropene, and trinexapac.

In the present invention, particularly preferable examples of the herbicides to be used in combination with the present uracil compound include glyphosate-potassium salt, glyphosate-guanidine salt, glyphosate-dimethylamine salt, glyphosate-monoethanolamine salt, glufosinate-ammonium salt, glyphosate-isopropylammonium salt, flumiclorac-pentyl, clethodim, lactofen, S-metolachlor, metribuzin, flufenacet, nicosulfuron, rimsulfuron, acetochlor, mesotrione, isoxaflutole, chlorimuron-ethyl, thifensulfuron-methyl, cloransulam-methyl, imazethapyr-ammonium salt, flumioxazin, saflufenacil, and trifludimoxazin.

In the present invention, particularly preferable examples of the safeners to be used in combination with the present uracil compound include cyprosulfamide, benoxacor, dichlormid, and furilazole.

In the case where the present uracil compound is used in combination with the other herbicides and/or safeners, examples of combination of the present uracil compound and the other herbicides and/or safeners are listed below, but are not limited thereto. In each of the combinations, a ratio of the compound to be combined with the present uracil compound as opposed to the present uracil compound is usually within a range of 0.01 to 1,000 times by weight, preferably within a range of 0.1 to 100 times by weight, and more preferably within a range of 1 to 10 times by weight. Specific examples of number of times for the above ratio by weight include 0.2 times, 0.3 times, 0.4 times, 0.5 times, 0.6 times, 0.8 times, 0.9 times, 1.5 times, 2 times (twice), 3 times, 4 times, 5 times, 6 times, 7 times, 8 times, 9 times, 15 times, 20 times, 30 times, 40 times, 50 times, 60 times, 70 times, 80 times, 90 times, 150 times, 200 times, 300 times, 400 times, 500 times, 600 times, 700 times, 800 times and 900 times.

Examples of specific combinations are disclosed below:
a combination of compound X and quinclorac;
a combination of compound X and quinmerac;
a combination of compound X and bromoxynil;
a combination of compound X and bromoxynil-octanoate;
a combination of compound X and dichlobenil;
a combination of compound X and methiozolin;
a combination of compound X and ioxynil;
a combination of compound X and ioxynil-octanoate;
a combination of compound X and di-allate;
a combination of compound X and butylate;
a combination of compound X and tri-allate;
a combination of compound X and phenmedipham;
a combination of compound X and chlorpropham;
a combination of compound X and desmedipham;
a combination of compound X and asulam;
a combination of compound X and phenisopham;
a combination of compound X and benthiocarb;
a combination of compound X and molinate;
a combination of compound X and esprocarb;
a combination of compound X and pyributicarb;
a combination of compound X and prosulfocarb;
a combination of compound X and orbencarb;
a combination of compound X and EPTC;
a combination of compound X and dimepiperate;
a combination of compound X and swep;
a combination of compound X and propachlor;
a combination of compound X and metazachlor;
a combination of compound X and alachlor;
a combination of compound X and acetochlor;
a combination of compound X and metolachlor;
a combination of compound X and S-metolachlor;
a combination of compound X and butachlor;
a combination of compound X and pretilachlor;
a combination of compound X and thenylchlor;
a combination of compound X and aminocyclopyrachlor;
a combination of compound X and aminocyclopyrachlor-methyl;
a combination of compound X and aminocyclopyrachlor-potassium;
a combination of compound X and trifluralin;
a combination of compound X and pendimethalin;
a combination of compound X and ethalfluralin;
a combination of compound X and benfluralin;
a combination of compound X and prodiamine;
a combination of compound X and simazine;
a combination of compound X and atrazine;
a combination of compound X and propazine;
a combination of compound X and cyanazine;
a combination of compound X and ametryn;
a combination of compound X and simetryn;
a combination of compound X and dimethametryn;
a combination of compound X and indaziflam;
a combination of compound X and triaziflam;
a combination of compound X and metribuzin;
a combination of compound X and hexazinone;
a combination of compound X and terbumeton;
a combination of compound X and terbuthylazine;

a combination of compound X and terbutryn;
a combination of compound X and trietazine;
a combination of compound X and isoxaben;
a combination of compound X and diflufenican;
a combination of compound X and diuron;
a combination of compound X and linuron;
a combination of compound X and metobromuron;
a combination of compound X and metoxuron;
a combination of compound X and monolinuron;
a combination of compound X and siduron;
a combination of compound X and fluometuron;
a combination of compound X and difenoxuron;
a combination of compound X and methyl-daymuron;
a combination of compound X and isoproturon;
a combination of compound X and isouron;
a combination of compound X and tebuthiuron;
a combination of compound X and benzthiazuron;
a combination of compound X and methabenzthiazuron;
a combination of compound X and propanil;
a combination of compound X and mefenacet;
a combination of compound X and clomeprop;
a combination of compound X and naproanilide;
a combination of compound X and bromobutide;
a combination of compound X and daimuron;
a combination of compound X and cumyluron;
a combination of compound X and diflufenzopyr;
a combination of compound X and etobenzanid;
a combination of compound X and bentazon;
a combination of compound X and tridiphane;
a combination of compound X and indanofan;
a combination of compound X and amitrole;
a combination of compound X and fenchlorazole-ethyl;
a combination of compound X and mefenpyr-diethyl;
a combination of compound X and benoxacor;
a combination of compound X and dichlormid;
a combination of compound X and cloquintocet-mexyl;
a combination of compound X and cyprosulfamide;
a combination of compound X and isoxadifen-ethyl;
a combination of compound X and clomazone;
a combination of compound X and maleic hydrazide;
a combination of compound X and pyridate;
a combination of compound X and chloridazon;
a combination of compound X and bromacil;
a combination of compound X and terbacil;
a combination of compound X and lenacil;
a combination of compound X and oxaziclomefone;
a combination of compound X and cinmethylin;
a combination of compound X and benfuresate;
a combination of compound X and cafenstrole;
a combination of compound X and flufenacet;
a combination of compound X and pyrithiobac;
a combination of compound X and pyrithiobac-sodium salt;
a combination of compound X and pyriminobac;
a combination of compound X and pyriminobac-methyl;
a combination of compound X and bispyribac;
a combination of compound X and bispyribac-sodium salt;
a combination of compound X and pyribenzoxim;
a combination of compound X and pyrimisulfan;
a combination of compound X and pyriftalid;
a combination of compound X and triafamone;
a combination of compound X and fentrazamide;
a combination of compound X and dimethenamid;
a combination of compound X and dimethenamid-P;
a combination of compound X and ACN;
a combination of compound X and dithiopyr;
a combination of compound X and triclopyr;
a combination of compound X and triclopyr-butotyl;
a combination of compound X and triclopyr-ammonium salt;
a combination of compound X and fluroxypyr;
a combination of compound X and fluroxypyr-meptyl;
a combination of compound X and thiazopyr;
a combination of compound X and aminopyralid;
a combination of compound X and aminopyralid-potassium salt;
a combination of compound X and aminopyralid-triisopropanolamine salt;
a combination of compound X and clopyralid-olamine salt;
a combination of compound X and clopyralid-potassium salt;
a combination of compound X and clopyralid-triethylammonium salt;
a combination of compound X and picloram-potassium salt;
a combination of compound X and picloram-triisopropanolamine salt;
a combination of compound X and dalapon;
a combination of compound X and chlorthiamid;
a combination of compound X and amidosulfuron;
a combination of compound X and azimsulfuron;
a combination of compound X and bensulfuron-methyl;
a combination of compound X and chlorimuron-ethyl;
a combination of compound X and cyclosulfamuron;
a combination of compound X and ethoxysulfuron;
a combination of compound X and flazasulfuron;
a combination of compound X and flucetosulfuron;
a combination of compound X and flupyrsulfuron-methyl-sodium;
a combination of compound X and foramsulfuron;
a combination of compound X and halosulfuron-methyl;
a combination of compound X and imazosulfuron;
a combination of compound X and mesosulfuron-methyl;
a combination of compound X and metazosulfuron;
a combination of compound X and nicosulfuron;
a combination of compound X and orthosulfamuron;
a combination of compound X and oxasulfuron;
a combination of compound X and primisulfuron-methyl;
a combination of compound X and propyrisulfuron;
a combination of compound X and pyrazosulfuron-ethyl;
a combination of compound X and rimsulfuron;
a combination of compound X and sulfometuron-methyl;
a combination of compound X and sulfosulfuron;
a combination of compound X and trifloxysulfuron-sodium salt;
a combination of compound X and chlorsulfuron;
a combination of compound X and cinosulfuron;
a combination of compound X and ethametsulfuron-methyl;
a combination of compound X and iodosulfuron-methyl-sodium;
a combination of compound X and iofensulfuron-sodium;
a combination of compound X and metsulfuron-methyl;
a combination of compound X and prosulfuron;
a combination of compound X and thifensulfuron-methyl;
a combination of compound X and triasulfuron;
a combination of compound X and tribenuron-methyl;
a combination of compound X and triflusulfuron-methyl;
a combination of compound X and tritosulfuron;
a combination of compound X and picolinafen;
a combination of compound X and beflubutamid;
a combination of compound X and norflurazon;

a combination of compound X and fluridone;
a combination of compound X and flurochloridone;
a combination of compound X and flurtamone;
a combination of compound X and benzobicyclon;
a combination of compound X and bicyclopyrone;
a combination of compound X and mesotrione;
a combination of compound X and sulcotrione;
a combination of compound X and tefuryltrione;
a combination of compound X and tembotrione;
a combination of compound X and isoxachlortole;
a combination of compound X and isoxaflutole;
a combination of compound X and benzofenap;
a combination of compound X and pyrasulfotole;
a combination of compound X and pyrazolynate;
a combination of compound X and pyrazoxyfen;
a combination of compound X and topramezone;
a combination of compound X and tolpyralate;
a combination of compound X and lancotrione-sodium salt;
a combination of compound X and flupoxam;
a combination of compound X and amicarbazone;
a combination of compound X and bencarbazone;
a combination of compound X and flucarbazone-sodium salt;
a combination of compound X and ipfencarbazone;
a combination of compound X and propoxycarbazone-sodium salt;
a combination of compound X and thiencarbazone-methyl;
a combination of compound X and cloransulam-methyl;
a combination of compound X and diclosulam;
a combination of compound X and florasulam;
a combination of compound X and flumetsulam;
a combination of compound X and metosulam;
a combination of compound X and penoxsulam;
a combination of compound X and pyroxsulam;
a combination of compound X and imazamethabenz-methyl;
a combination of compound X and imazamox-ammonium salt;
a combination of compound X and imazapic-ammonium salt;
a combination of compound X and imazapyr-isopropylammonium salt;
a combination of compound X and imazaquin-ammonium salt;
a combination of compound X and imazethapyr-ammonium salt;
a combination of compound X and clodinafop-propargyl;
a combination of compound X and cyhalofop-buty;
a combination of compound X and diclofop-methyl;
a combination of compound X and fenoxaprop-ethyl;
a combination of compound X and fenoxaprop-P-ethyl;
a combination of compound X and fluazifop-butyl;
a combination of compound X and fluazifop-P-butyl;
a combination of compound X and haloxyfop-methyl;
a combination of compound X and haloxyfop-P-methyl;
a combination of compound X and propaquizafop;
a combination of compound X and quizalofop-ethyl;
a combination of compound X and quizalofop-P-ethyl;
a combination of compound X and alloxydim;
a combination of compound X and clethodim;
a combination of compound X and sethoxydim;
a combination of compound X and tepraloxydim;
a combination of compound X and tralkoxydim;
a combination of compound X and pinoxaden;
a combination of compound X and fenoxasulfone;
a combination of compound X and glufosinate;
a combination of compound X and glufosinate-ammonium salt;
a combination of compound X and glufosinate-P;
a combination of compound X and glufosinate-P-sodium salt;
a combination of compound X and bialaphos;
a combination of compound X and anilofos;
a combination of compound X and bensulide;
a combination of compound X and butamifos;
a combination of compound X and paraquat;
a combination of compound X and paraquat-dichloride;
a combination of compound X and diquat;
a combination of compound X and diquat-dibromide;
a combination of compound X and halauxifen;
a combination of compound X and halauxifen-methyl;
a combination of compound X and florpyrauxifen;
a combination of compound X and florpyrauxifen-benzyl;
a combination of compound X and flumiclorac-pentyl;
a combination of compound X and fomesafen-sodium salt;
a combination of compound X and lactofen;
a combination of compound X and tiafenacil;
a combination of compound X and acifluorfen-sodium salt;
a combination of compound X and aclonifen;
a combination of compound X and bifenox;
a combination of compound X and chlomethoxyfen;
a combination of compound X and chlornitrofen;
a combination of compound X and ethoxyfen-ethyl;
a combination of compound X and fluorodifen;
a combination of compound X and fluoroglycofen-ethyl;
a combination of compound X and fluoronitrofen;
a combination of compound X and halosafen;
a combination of compound X and nitrofen;
a combination of compound X and nitrofluorfen;
a combination of compound X and oxyfluorfen;
a combination of compound X and cinidon-ethyl;
a combination of compound X and profluazol;
a combination of compound X and pyraclonil;
a combination of compound X and oxadiargyl;
a combination of compound X and oxadiazon;
a combination of compound X and pentoxazone;
a combination of compound X and fluazolate;
a combination of compound X and pyraflufen-ethyl;
a combination of compound X and benzfendizone;
a combination of compound X and butafenacil;
a combination of compound X and fluthiacet-methyl;
a combination of compound X and thidiazimin;
a combination of compound X and azafenidin;
a combination of compound X and carfentrazone-ethyl;
a combination of compound X and sulfentrazone;
a combination of compound X and flufenpyr-ethyl;
a combination of compound X and glyphosate;
a combination of compound X and glyphosate-isopropylammonium salt;
a combination of compound X and glyphosate-ammonium salt;
a combination of compound X and glyphosate-potassium salt;
a combination of compound X and glyphosate-guanidine salt;
a combination of compound X and glyphosate-dimethylamine salt;
a combination of compound X and glyphosate-monoethanolamine salt;
a combination of compound X and MCPA;

a combination of compound X and MCPA-dimethylammonium salt;
a combination of compound X and MCPA-2-ethylhexyl ester;
a combination of compound X and MCPA-isoctyl ester;
a combination of compound X and MCPA-sodium salt;
a combination of compound X and MCPB;
a combination of compound X and mecoprop;
a combination of compound X and mecoprop-dimethylammonium salt;
a combination of compound X and mecoprop-diolamine salt;
a combination of compound X and mecoprop-ethadyl ester;
a combination of compound X and mecoprop-2-ethylhexyl ester;
a combination of compound X and mecoprop-isoctyl ester;
a combination of compound X and mecoprop-methyl ester;
a combination of compound X and mecoprop-potassium salt;
a combination of compound X and mecoprop-sodium salt;
a combination of compound X and mecoprop-trolamine salt;
a combination of compound X and mecoprop-P;
a combination of compound X and mecoprop-P-dimethylammonium salt;
a combination of compound X and mecoprop-P-2-ethylhexyl ester;
a combination of compound X and mecoprop-P-isobutyl ester;
a combination of compound X and mecoprop-P-potassium salt;
a combination of compound X and dichlorprop;
a combination of compound X and dichlorprop-butotyl ester;
a combination of compound X and dichlorprop-dimethylammonium salt;
a combination of compound X and dichlorprop-2-ethylhexyl ester;
a combination of compound X and dichlorprop-isoctyl ester;
a combination of compound X and dichlorprop-methyl ester;
a combination of compound X and dichlorprop-potassium salt;
a combination of compound X and dichlorprop-sodium salt;
a combination of compound X and dichlorprop-P;
a combination of compound X and dichlorprop-P-dimethylammonium;
a combination of compound X and pyroxasulfone;
a combination of compound X and dicamba;
a combination of compound X and dicamba choline salt;
a combination of compound X and dicamba BAPMA salt;
a combination of compound X and dicamba-trolamine salt;
a combination of compound X and dicamba-diglycolamine salt;
a combination of compound X and dicamba-dimethylammonium;
a combination of compound X and dicamba-diolamine salt;
a combination of compound X and dicamba-isopropylammonium;
a combination of compound X and dicamba-methyl;
a combination of compound X and dicamba-olamine salt;
a combination of compound X and dicamba-potassium salt;
a combination of compound X and dicamba-sodium salt;
a combination of compound X and pyroxasulfone;
a combination of compound X and 2,4-D;
a combination of compound X and 2,4-D choline salt;
a combination of compound X and 2,4-D BAPMA salt;
a combination of compound X and 2,4-D-2-butoxypropyl;
a combination of compound X and 2,4-D-2-ethylhexyl;
a combination of compound X and 2,4-D-ammonium;
a combination of compound X and 2,4-D-butotyl;
a combination of compound X and 2,4-D-butyl;
a combination of compound X and 2,4-D-diethylammonium;
a combination of compound X and 2,4-D-dimethylammonium;
a combination of compound X and 2,4-D-diolamine salt;
a combination of compound X and 2,4-D-dodecylammonium;
a combination of compound X and 2,4-D-ethyl;
a combination of compound X and 2,4-D-heptylammonium;
a combination of compound X and 2,4-D-isobutyl;
a combination of compound X and 2,4-D-isooctyl;
a combination of compound X and 2,4-D-isopropyl;
a combination of compound X and 2,4-D-isopropylammonium;
a combination of compound X and 2,4-D-lithium salt;
a combination of compound X and 2,4-D-mepty;
a combination of compound X and 2,4-D-methyl;
a combination of compound X and 2,4-D-octyl;
a combination of compound X and 2,4-D-pentyl;
a combination of compound X and 2,4-D-propyl;
a combination of compound X and 2,4-D-sodium salt;
a combination of compound X and 2,4-D-tefuryl;
a combination of compound X and 2,4-D-tetradecylammonium;
a combination of compound X and 2,4-D-triethylammonium;
a combination of compound X and 2,4-D-tris(2-hydroxypropyl)ammonium;
a combination of compound X and 2,4-D-trolamine salt;
a combination of compound X and flumioxazin;
a combination of compound X and saflufenacil;
a combination of compound X and trifludimoxazin;
a combination of compound Y and quinclorac;
a combination of compound Y and quinmerac;
a combination of compound Y and bromoxynil;
a combination of compound Y and bromoxynil-octanoate;
a combination of compound Y and dichlobenil;
a combination of compound Y and methiozolin;
a combination of compound Y and ioxynil;
a combination of compound Y and ioxynil-octanoate;
a combination of compound Y and di-allate;
a combination of compound Y and butylate;
a combination of compound Y and tri-allate;
a combination of compound Y and phenmedipham;
a combination of compound Y and chlorpropham;
a combination of compound Y and desmedipham;
a combination of compound Y and asulam;
a combination of compound Y and phenisopham;
a combination of compound Y and benthiocarb;
a combination of compound Y and molinate;
a combination of compound Y and esprocarb;
a combination of compound Y and pyributicarb;

a combination of compound Y and prosulfocarb;
a combination of compound Y and orbencarb;
a combination of compound Y and EPTC;
a combination of compound Y and dimepiperate;
a combination of compound Y and swep;
a combination of compound Y and propachlor;
a combination of compound Y and metazachlor;
a combination of compound Y and alachlor;
a combination of compound Y and acetochlor;
a combination of compound Y and metolachlor;
a combination of compound Y and S-metolachlor;
a combination of compound Y and butachlor;
a combination of compound Y and pretilachlor;
a combination of compound Y and thenylchlor;
a combination of compound Y and aminocyclopyrachlor;
a combination of compound Y and aminocyclopyrachlor-methyl;
a combination of compound Y and aminocyclopyrachlor-potassium;
a combination of compound Y and trifluralin;
a combination of compound Y and pendimethalin;
a combination of compound Y and ethalfluralin;
a combination of compound Y and benfluralin;
a combination of compound Y and prodiamine;
a combination of compound Y and simazine;
a combination of compound Y and atrazine;
a combination of compound Y and propazine;
a combination of compound Y and cyanazine;
a combination of compound Y and ametryn;
a combination of compound Y and simetryn;
a combination of compound Y and dimethametryn;
a combination of compound Y and indaziflam;
a combination of compound Y and triaziflam;
a combination of compound Y and metribuzin;
a combination of compound Y and hexazinone;
a combination of compound Y and terbumeton;
a combination of compound Y and terbuthylazine;
a combination of compound Y and terbutryn;
a combination of compound Y and trietazine;
a combination of compound Y and isoxaben;
a combination of compound Y and diflufenican;
a combination of compound Y and diuron;
a combination of compound Y and linuron;
a combination of compound Y and metobromuron;
a combination of compound Y and metoxuron;
a combination of compound Y and monolinuron;
a combination of compound Y and siduron;
a combination of compound Y and fluometuron;
a combination of compound Y and difenoxuron;
a combination of compound Y and methyl-daymuron;
a combination of compound Y and isoproturon;
a combination of compound Y and isouron;
a combination of compound Y and tebuthiuron;
a combination of compound Y and benzthiazuron;
a combination of compound Y and methabenzthiazuron;
a combination of compound Y and propanil;
a combination of compound Y and mefenacet;
a combination of compound Y and clomeprop;
a combination of compound Y and naproanilide;
a combination of compound Y and bromobutide;
a combination of compound Y and daimuron;
a combination of compound Y and cumyluron;
a combination of compound Y and diflufenzopyr;
a combination of compound Y and etobenzanid;
a combination of compound Y and bentazon;
a combination of compound Y and tridiphane;
a combination of compound Y and indanofan;
a combination of compound Y and amitrole;
a combination of compound Y and fenchlorazole-ethyl;
a combination of compound Y and mefenpyr-diethyl;
a combination of compound Y and benoxacor;
a combination of compound Y and dichlormid;
a combination of compound Y and cloquintocet-mexyl;
a combination of compound Y and cyprosulfamide;
a combination of compound Y and isoxadifen-ethyl;
a combination of compound Y and clomazone;
a combination of compound Y and maleic hydrazide;
a combination of compound Y and pyridate;
a combination of compound Y and chloridazon;
a combination of compound Y and bromacil;
a combination of compound Y and terbacil;
a combination of compound Y and lenacil;
a combination of compound Y and oxaziclomefone;
a combination of compound Y and cinmethylin;
a combination of compound Y and benfuresate;
a combination of compound Y and cafenstrole;
a combination of compound Y and flufenacet;
a combination of compound Y and pyrithiobac;
a combination of compound Y and pyrithiobac-sodium salt;
a combination of compound Y and pyriminobac;
a combination of compound Y and pyriminobac-methyl;
a combination of compound Y and bispyribac;
a combination of compound Y and bispyribac-sodium salt;
a combination of compound Y and pyribenzoxim;
a combination of compound Y and pyrimisulfan;
a combination of compound Y and pyriftalid;
a combination of compound Y and triafamone;
a combination of compound Y and fentrazamide;
a combination of compound Y and dimethenamid;
a combination of compound Y and dimethenamid-P;
a combination of compound Y and ACN;
a combination of compound Y and dithiopyr;
a combination of compound Y and triclopyr;
a combination of compound Y and triclopyr-butotyl;
a combination of compound Y and triclopyr-ammonium salt;
a combination of compound Y and fluroxypyr;
a combination of compound Y and fluroxypyr-meptyl;
a combination of compound Y and thiazopyr;
a combination of compound Y and aminopyralid;
a combination of compound Y and aminopyralid-potassium salt;
a combination of compound Y and aminopyralid-triisopropanolamine salt;
a combination of compound Y and clopyralid-olamine salt;
a combination of compound Y and clopyralid-potassium salt;
a combination of compound Y and clopyralid-triethylammonium salt;
a combination of compound Y and picloram-potassium salt;
a combination of compound Y and picloram-triisopropanolamine salt;
a combination of compound Y and dalapon;
a combination of compound Y and chlorthiamid;
a combination of compound Y and amidosulfuron;
a combination of compound Y and azimsulfuron;
a combination of compound Y and bensulfuron-methyl;
a combination of compound Y and chlorimuron-ethyl;
a combination of compound Y and cyclosulfamuron;
a combination of compound Y and ethoxysulfuron;

a combination of compound Y and flazasulfuron;
a combination of compound Y and flucetosulfuron;
a combination of compound Y and flupyrsulfuron-methyl-sodium;
a combination of compound Y and foramsulfuron;
a combination of compound Y and halosulfuron-methyl;
a combination of compound Y and imazosulfuron;
a combination of compound Y and mesosulfuron-methyl;
a combination of compound Y and metazosulfuron;
a combination of compound Y and nicosulfuron;
a combination of compound Y and orthosulfamuron;
a combination of compound Y and oxasulfuron;
a combination of compound Y and primisulfuron-methyl;
a combination of compound Y and propyrisulfuron;
a combination of compound Y and pyrazosulfuron-ethyl;
a combination of compound Y and rimsulfuron;
a combination of compound Y and sulfometuron-methyl;
a combination of compound Y and sulfosulfuron;
a combination of compound Y and trifloxysulfuron-sodium salt;
a combination of compound Y and chlorsulfuron;
a combination of compound Y and cinosulfuron;
a combination of compound Y and ethametsulfuron-methyl;
a combination of compound Y and iodosulfuron-methyl-sodium;
a combination of compound Y and iofensulfuron-sodium;
a combination of compound Y and metsulfuron-methyl;
a combination of compound Y and prosulfuron;
a combination of compound Y and thifensulfuron-methyl;
a combination of compound Y and triasulfuron;
a combination of compound Y and tribenuron-methyl;
a combination of compound Y and triflusulfuron-methyl;
a combination of compound Y and tritosulfuron;
a combination of compound Y and picolinafen;
a combination of compound Y and beflubutamid;
a combination of compound Y and norflurazon;
a combination of compound Y and fluridone;
a combination of compound Y and flurochloridone;
a combination of compound Y and flurtamone;
a combination of compound Y and benzobicyclon;
a combination of compound Y and bicyclopyrone;
a combination of compound Y and mesotrione;
a combination of compound Y and sulcotrione;
a combination of compound Y and tefuryltrione;
a combination of compound Y and tembotrione;
a combination of compound Y and isoxachlortole;
a combination of compound Y and isoxaflutole;
a combination of compound Y and benzofenap;
a combination of compound Y and pyrasulfotole;
a combination of compound Y and pyrazolynate;
a combination of compound Y and pyrazoxyfen;
a combination of compound Y and topramezone;
a combination of compound Y and tolpyralate;
a combination of compound Y and lancotrione-sodium salt;
a combination of compound Y and flupoxam;
a combination of compound Y and amicarbazone;
a combination of compound Y and bencarbazone;
a combination of compound Y and flucarbazone-sodium salt;
a combination of compound Y and ipfencarbazone;
a combination of compound Y and propoxycarbazone-sodium salt;
a combination of compound Y and thiencarbazone-methyl;
a combination of compound Y and cloransulam-methyl;
a combination of compound Y and diclosulam;
a combination of compound Y and florasulam;
a combination of compound Y and flumetsulam;
a combination of compound Y and metosulam;
a combination of compound Y and penoxsulam;
a combination of compound Y and pyroxsulam;
a combination of compound Y and imazamethabenz-methyl;
a combination of compound Y and imazamox-ammonium salt;
a combination of compound Y and imazapic-ammonium salt;
a combination of compound Y and imazapyr-isopropylammonium salt;
a combination of compound Y and imazaquin-ammonium salt;
a combination of compound Y and imazethapyr-ammonium salt;
a combination of compound Y and clodinafop-propargyl;
a combination of compound Y and cyhalofop-buty;
a combination of compound Y and diclofop-methyl;
a combination of compound Y and fenoxaprop-ethyl;
a combination of compound Y and fenoxaprop-P-ethyl;
a combination of compound Y and fluazifop-butyl;
a combination of compound Y and fluazifop-P-butyl;
a combination of compound Y and haloxyfop-methyl;
a combination of compound Y and haloxyfop-P-methyl;
a combination of compound Y and propaquizafop;
a combination of compound Y and quizalofop-ethyl;
a combination of compound Y and quizalofop-P-ethyl;
a combination of compound Y and alloxydim;
a combination of compound Y and clethodim;
a combination of compound Y and sethoxydim;
a combination of compound Y and tepraloxydim;
a combination of compound Y and tralkoxydim;
a combination of compound Y and pinoxaden;
a combination of compound Y and fenoxasulfone;
a combination of compound Y and glufosinate;
a combination of compound Y and glufosinate-ammonium salt;
a combination of compound Y and glufosinate-P;
a combination of compound Y and glufosinate-P-sodium salt;
a combination of compound Y and bialaphos;
a combination of compound Y and anilofos;
a combination of compound Y and bensulide;
a combination of compound Y and butamifos;
a combination of compound Y and paraquat;
a combination of compound Y and paraquat-dichloride;
a combination of compound Y and diquat;
a combination of compound Y and diquat-dibromide;
a combination of compound Y and halauxifen;
a combination of compound Y and halauxifen-methyl;
a combination of compound Y and florpyrauxifen;
a combination of compound Y and florpyrauxifen-benzyl;
a combination of compound Y and flumiclorac-pentyl;
a combination of compound Y and fomesafen-sodium salt;
a combination of compound Y and lactofen;
a combination of compound Y and tiafenacil;
a combination of compound Y and acifluorfen-sodium salt;
a combination of compound Y and aclonifen;
a combination of compound Y and bifenox;
a combination of compound Y and chlomethoxyfen;
a combination of compound Y and chlornitrofen;
a combination of compound Y and ethoxyfen-ethyl;

a combination of compound Y and fluorodifen;
a combination of compound Y and fluoroglycofen-ethyl;
a combination of compound Y and fluoronitrofen;
a combination of compound Y and halosafen;
a combination of compound Y and nitrofen;
a combination of compound Y and nitrofluorfen;
a combination of compound Y and oxyfluorfen;
a combination of compound Y and cinidon-ethyl;
a combination of compound Y and profluazol;
a combination of compound Y and pyraclonil;
a combination of compound Y and oxadiargyl;
a combination of compound Y and oxadiazon;
a combination of compound Y and pentoxazone;
a combination of compound Y and fluazolate;
a combination of compound Y and pyraflufen-ethyl;
a combination of compound Y and benzfendizone;
a combination of compound Y and butafenacil;
a combination of compound Y and fluthiacet-methyl;
a combination of compound Y and thidiazimin;
a combination of compound Y and azafenidin;
a combination of compound Y and carfentrazone-ethyl;
a combination of compound Y and sulfentrazone;
a combination of compound Y and flufenpyr-ethyl;
a combination of compound Y and glyphosate;
a combination of compound Y and glyphosate-isopropylammonium salt;
a combination of compound Y and glyphosate-ammonium salt;
a combination of compound Y and glyphosate-potassium salt;
a combination of compound Y and glyphosate-guanidine salt;
a combination of compound Y and glyphosate-dimethylamine salt;
a combination of compound Y and glyphosate-monoethanolamine salt;
a combination of compound Y and MCPA;
a combination of compound Y and MCPA-dimethylammonium salt;
a combination of compound Y and MCPA-2-ethylhexyl ester;
a combination of compound Y and MCPA-isoctyl ester;
a combination of compound Y and MCPA-sodium salt;
a combination of compound Y and MCPB;
a combination of compound Y and mecoprop;
a combination of compound Y and mecoprop-dimethylammonium salt;
a combination of compound Y and mecoprop-diolamine salt;
a combination of compound Y and mecoprop-ethadyl ester;
a combination of compound Y and mecoprop-2-ethylhexyl ester;
a combination of compound Y and mecoprop-isoctyl ester;
a combination of compound Y and mecoprop-methyl ester;
a combination of compound Y and mecoprop-potassium salt;
a combination of compound Y and mecoprop-sodium salt;
a combination of compound Y and mecoprop-trolamine salt;
a combination of compound Y and mecoprop-P;
a combination of compound Y and mecoprop-P-dimethylammonium salt;
a combination of compound Y and mecoprop-P-2-ethylhexyl ester;
a combination of compound Y and mecoprop-P-isobutyl ester;
a combination of compound Y and mecoprop-P-potassium salt;
a combination of compound Y and dichlorprop;
a combination of compound Y and dichlorprop-butotyl ester;
a combination of compound Y and dichlorprop-dimethylammonium salt;
a combination of compound Y and dichlorprop-2-ethylhexyl ester;
a combination of compound Y and dichlorprop-isoctyl ester;
a combination of compound Y and dichlorprop-methyl ester;
a combination of compound Y and dichlorprop-potassium salt;
a combination of compound Y and dichlorprop-sodium salt;
a combination of compound Y and dichlorprop-P;
a combination of compound Y and dichlorprop-P-dimethylammonium;
a combination of compound Y and pyroxasulfone;
a combination of compound Y and dicamba;
a combination of compound Y and dicamba choline salt;
a combination of compound Y and dicamba BAPMA salt;
a combination of compound Y and dicamba-trolamine salt;
a combination of compound Y and dicamba-diglycolamine salt;
a combination of compound Y and dicamba-dimethylammonium;
a combination of compound Y and dicamba-diolamine salt;
a combination of compound Y and dicamba-isopropylammonium;
a combination of compound Y and dicamba-methyl;
a combination of compound Y and dicamba-olamine salt;
a combination of compound Y and dicamba-potassium salt;
a combination of compound Y and dicamba-sodium salt;
a combination of compound Y and pyroxasulfone;
a combination of compound Y and 2,4-D;
a combination of compound Y and 2,4-D choline salt;
a combination of compound Y and 2,4-D BAPMA salt;
a combination of compound Y and 2,4-D-2-butoxypropyl;
a combination of compound Y and 2,4-D-2-ethylhexyl;
a combination of compound Y and 2,4-D-ammonium;
a combination of compound Y and 2,4-D-butotyl;
a combination of compound Y and 2,4-D-butyl;
a combination of compound Y and 2,4-D-diethylammonium;
a combination of compound Y and 2,4-D-dimethylammonium;
a combination of compound Y and 2,4-D-diolamine salt;
a combination of compound Y and 2,4-D-dodecylammonium;
a combination of compound Y and 2,4-D-ethyl;
a combination of compound Y and 2,4-D-heptylammonium;
a combination of compound Y and 2,4-D-isobutyl;
a combination of compound Y and 2,4-D-isooctyl;
a combination of compound Y and 2,4-D-isopropyl;
a combination of compound Y and 2,4-D-isopropylammonium;
a combination of compound Y and 2,4-D-lithium salt;
a combination of compound Y and 2,4-D-mepty;

a combination of compound Y and 2,4-D-methyl;
a combination of compound Y and 2,4-D-octyl;
a combination of compound Y and 2,4-D-pentyl;
a combination of compound Y and 2,4-D-propyl;
a combination of compound Y and 2,4-D-sodium salt;
a combination of compound Y and 2,4-D-tefuryl;
a combination of compound Y and 2,4-D-tetradecylammonium;
a combination of compound Y and 2,4-D-triethylammonium;
a combination of compound Y and 2,4-D-tris (2-hydroxypropyl) ammonium;
a combination of compound Y and 2,4-D-trolamine salt;
a combination of compound Y and flumioxazin;
a combination of compound Y and saflufenacil; and
a combination of compound Y and trifludimoxazin.

In the cultivation of a crop in the present invention, a plant-nutritional management in a common crop cultivation can be carried out. A fertilization system may be one based on Precision Agriculture, or may be a conventional homogeneous one. Further, when the application to seeds are performed, a nitrogen-fixing bacterium or a mycorrhizal fungus may also be inoculated together with one or more agrochemical active ingredients selected from the compounds of Group A.

EXAMPLES

Hereinafter, the present invention is described in more detail by way of Examples. However, the present invention is not limited to these Examples.

At first, criteria for the evaluation of the herbicidal effect and the harmful effect on crops shown in the below-mentioned examples is described.
[Herbicidal Effect and Harmful Effect on Crops]
The herbicidal effect was rated within a range of 0 to 100, wherein "0" was a rating where the state of emergence or growth of a sample weed during a test had no difference or little difference compared with the state of the test weed that did not subjected to the treatment, and "100" was a rating where the test plant was completely killed or the emergence or growth of the test weed was completely suppressed.

The harmful effect on crops was rated as "harmless" when little harmful effect was observed, "low" when a moderate level of harmful effect was observed, "medium" when a medium level of harmful effect was observed, and "high" when a high level of harmful effect was observed.

Example 1

In a plastic pot, palmer amaranth (*Amaranthus palmeri*) having an Arg128Met mutation in PPO2 is seeded. On the same day, compound X is applied to the surface of soil so that the application rate of the compound X is 10, 20, 40, or 80 g/ha and the spray liquid amount is 200 L/ha. The plastic pot is then placed in a greenhouse, and at 7 days after the application, soybeans are seeded, and further at 14 days after seeding the soybeans, the effect on the weeds and crop injuries on the soybeans are investigated. An effective control effect on the palmer amaranth is confirmed.

Example 2

In a plastic pot, palmer amaranth (*Amaranthus palmeri*) having an Arg128Met mutation in PPO2 and soybeans are seeded. On the same day, compound X is applied to the surface of soil so that the application rate of the compound X is 10, 20, 40, or 80 g/ha and the spray liquid amount is 200 L/ha. The soybeans are then cultivated in a greenhouse, and at 21 days after seeding, the effect on the weeds and crop injuries on the soybeans are investigated. An effective control effect on the palmer amaranth is confirmed.

Example 3

In a plastic pot, palmer amaranth (*Amaranthus palmeri*) having an Arg128Met mutation in PPO2 and soybeans are seeded. The soybeans are then cultivated in a greenhouse, and at 21 days after seeding, compound X is applied to the stem and leaf so that the application rate of the compound X is 10, 20, 40, or 80 g/ha and the spray liquid amount is 200 L/ha. Further, the soybeans are cultivated in the greenhouse, and at 14 days after the application of compound X, the effect on the weeds and crop injuries on the soybeans are investigated. An effective control effect on the palmer amaranth is confirmed.

Examples 4 to 6

The application is performed in the same manner, except that the palmer amaranth (*Amaranthus palmeri*) of Examples 1 to 3 is replaced with palmer amaranth (*Amaranthus palmeri*) having an Arg128Gly mutation in PPO2. An effective control effect on the palmer amaranth is confirmed.

Examples 7 to 9

The application is performed in the same manner, except that the palmer amaranth (*Amaranthus palmeri*) of Examples 1 to 3 is replaced with palmer amaranth (*Amaranthus palmeri*) having an Arg128His mutation in PPO2. An effective control effect on the palmer amaranth is confirmed.

Examples 10 to 12

The application is performed in the same manner, except that the palmer amaranth (*Amaranthus palmeri*) of Examples 1 to 3 is replaced with palmer amaranth (*Amaranthus palmeri*) having an Arg128Ile mutation in PPO2. An effective control effect on the palmer amaranth is confirmed.

Examples 13 to 15

The application is performed in the same manner, except that the palmer amaranth (*Amaranthus palmeri*) of Examples 1 to 3 is replaced with palmer amaranth (*Amaranthus palmeri*) having an Arg128Lys mutation in PPO2. An effective control effect on the palmer amaranth is confirmed.

Examples 16 to 18

The application is performed in the same manner, except that the palmer amaranth (*Amaranthus palmeri*) of Examples 1 to 3 is replaced with palmer amaranth (*Amaranthus palmeri*) having a Gly399Ala mutation in PPO2. An effective control effect on the palmer amaranth is confirmed.

Examples 19 to 36

The application is performed in the same manner, except that the palmer amaranth (*Amaranthus palmeri*) of Examples 1 to 18 is replaced with waterhemp (*Amaranthus tuberculatus=Amaranthus rudis=Amaranthus tamariscinus*). An effective control effect on the waterhemp is confirmed.

Examples 37 to 54

The application is performed in the same manner, except that the palmer amaranth (*Amaranthus palmeri*) of Examples 1 to 18 is replaced with common ragweed (*Ambrosia artemisiifolia*). An effective control effect on the common ragweed is confirmed.

Examples 55 to 72

The application is performed in the same manner, except that the palmer amaranth (*Amaranthus palmeri*) of Examples 1 to 18 is replaced with rigid ryegrass (*Lolium rigidum*) or Italian ryegrass (*Lolium multiflorum*). An effective control effect on the rigid ryegrass or Italian ryegrass is confirmed.

Examples 73 to 144

The application is performed in the same manner, except that the compound X of Examples 1 to 72 is replaced with the compound Y. An effective control effect on the PPO inhibitor-resistant weeds is confirmed.

Examples 145 to 288

In each application of Examples 1 to 144, in addition to the compound X or compound Y, RoundupPowerMax (glyphosate-potassium salt 660 g/L) is further added so that the application rate is 32 fluid ounce/acre (1,543 g/ha as glyphosate-potassium salt). Then the application procedure is performed in the same manner. An effective control effect on the PPO inhibitor-resistant weeds is confirmed.

Examples 289 to 432

In each application of Examples 1 to 144, in addition to the compound X or compound Y, XtendiMax (dicamba-diglycolamine salt 480 g/L) is further added so that the application rate is 1 pint/acre (560 g/ha as dicamba-glycolamine salt). Then the application procedure is performed in the same manner. An effective control effect on the PPO inhibitor-resistant weeds is confirmed.

Examples 433 to 576

In each application of Examples 1 to 144, in addition to the compound X or compound Y, RoundupPowerMax and XtendiMax are further added so that the application rate of RoundupPowerMax is 32 fluid ounce/acre and the application rate of XtendiMax is 1 pint/acre, respectively. Then the application procedure is performed in the same manner. An effective control effect on the PPO inhibitor-resistant weeds is confirmed.

Examples 577 to 1152

The application is performed in the same manner, except that soybean of Examples 1 to 576 is replaced with corn or cotton.

An effective control effect on the PPO inhibitor-resistant weeds is confirmed.

Examples 1153 to 2304

The crops in Examples 1 to 1152 are replaced with crops produced by a transgenic technique, having both a Roundup Ready 2 Xtend trait and a trait having tolerance to PPO inhibitors due to having exogenous PPO in which the affinity to PPO inhibitors to be applied is lower than that to endogenous PPO in crops. Then the application procedure is performed in the same manner. An effective control effect on the PPO inhibitor-resistant weeds is confirmed.

Example 2305

Soil was filled in a plastic pot, and waterhemp (*Amaranthus tuberculatus=Amaranthus rudis=Amaranthus tamariscinus*) containing a Gly210 deficiency in PPO2, palmer amaranth (*Amaranthus palmeri*) containing an Arg128Met mutation in PPO2, and palmer amaranth (*Amaranthus palmeri*) containing a Gly399Ala mutation in PPO2 were seeded, and then grown in a greenhouse. When the plant height reached 10 cm, spray solution obtained by diluting an emulsifiable concentrate containing a predetermined amount of compound X with water containing a spreader was evenly sprayed from above the pot using a sprayer such that the spray solution amount was 200 L/ha and the application rate of the compound X was 5 g/ha. The plants were then grown for 14 days in the greenhouse, and the herbicidal effect was investigated. The results are shown in Table 1.

TABLE 1

| Weed species | Herbicidal effect |
| --- | --- |
| Waterhemp with Gly210 deficiency in PPO2 (Weed as described in Examples of the Patent Document 1) | 60 |
| Palmer amaranth with Arg128Met mutation in PPO2 | 100 |
| Palmer amaranth with Gly399Ala mutation in PPO2 | 100 |

Example 2306

Soil was filled in a plastic pot, and waterhemp (*Amaranthus tuberculatus=Amaranthus rudis=Amaranthus tamariscinus*) containing a Gly210 deficiency in PPO2, palmer amaranth (*Amaranthus palmeri*) containing an Arg128Met mutation in PPO2, and palmer amaranth (*Amaranthus palmeri*) containing a Gly399Ala mutation in PPO2 were seeded, and then grown in a greenhouse. When the plant height reached 30 cm, spray solution obtained by diluting an emulsifiable concentrate containing a predetermined amount of compound X with water containing a spreader was evenly sprayed from above the pot using a sprayer such that the spray solution amount was 200 L/ha and the application rate of the compound X was 20 g/ha. The plants were then grown for 7 days in the greenhouse, and the herbicidal effect was investigated. The results are shown in Table 2.

TABLE 2

| Weed species | Herbicidal effect |
| --- | --- |
| Waterhemp with Gly210 deficiency in PPO2 (Weed as described in Examples of the Patent Document 1) | 45 |

TABLE 2-continued

| Weed species | Herbicidal effect |
|---|---|
| Palmer amaranth with Arg128Met mutation in PPO2 | 95 |
| Palmer amaranth with Gly399Ala mutation in PPO2 | 97 |

INDUSTRIAL APPLICABILITY

The method of the present invention for controlling herbicide-resistant weeds can be used to control some specific weeds having resistance to herbicides.

The invention claimed is:

1. A method for controlling a palmar amaranth, comprising:
applying a compound of formula (I) to the palmar amaranth grown on a soil:

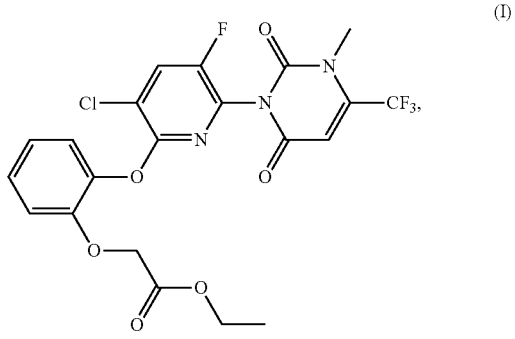 [SMILES: CCOC(=O)COc1ccccc1Oc1nc(-n2c(=O)cc(C(F)(F)F)n(C)c2=O)c(F)cc1Cl]

wherein the palmar amaranth is a PPO inhibitor-resistant palmar amaranth which has at least one mutation selected from the group consisting of Arg128Met mutation, Arg128Gly mutation, and Gly399Ala mutation in PPO,
wherein the applying comprises applying the compound of the formula (I) at an application rate of 5 to 40 g/ha and a spray liquid amount of 150 to 300 L/ha.

2. The method according to claim 1, wherein the method is carried out in a cultivation of crop.

3. The method according to claim 2, wherein the crop is selected from the group consisting of soybean, corn, cotton, rapeseed, rice, wheat, barley, sugar cane, sugar beet, sorghum, and sunflower.

4. The method according to claim 2, wherein the crop is imparted with tolerance to the compound of the formula (I).

5. The method according to claim 1, wherein the palmar amaranth has resistance to at least one compound selected from the group consisting of lactofen and fomesafen.

6. The method according to claim 1, wherein the palmar amaranth includes at least one mutation selected from the group consisting of Arg128Met mutation and Arg128Gly mutation in PPO.

7. The method according to claim 1, wherein the palmar amaranth includes at least one mutation selected from the group consisting of Arg128Gly mutation and Gly399Ala mutation in PPO.

8. The method according to claim 1, wherein the palmar amaranth includes at least one mutation selected from the group consisting of Arg128Met mutation and Gly399Ala mutation in PPO.

9. The method according to claim 1, wherein the palmar amaranth includes Arg128Met mutation in PPO.

10. The method according to claim 1, wherein the palmar amaranth includes Arg128Gly mutation in PPO.

11. The method according to claim 1, wherein the palmar amaranth includes Gly399Ala mutation in PPO.

12. The method according to claim 2, wherein the palmar amaranth includes Arg128Met mutation in PPO.

13. The method according to claim 2, wherein the palmar amaranth includes Arg128Gly mutation in PPO.

14. The method according to claim 2, wherein the palmar amaranth includes Gly399Ala mutation in PPO.

15. The method according to claim 1, wherein the application rate is 5-20 g/ha.

16. The method according to claim 15, wherein the applying comprises spraying a solution including water and the compound of the formula (I).

17. The method according to claim 4, wherein the application rate is 5-20 g/ha.

18. The method according to claim 17, wherein the applying comprises spraying a solution including water and the compound of the formula (I).

19. The method according to claim 8, wherein the application rate is 5-20 g/ha.

20. The method according to claim 1, wherein the spray liquid amount is 150 to 200 L/ha.

* * * * *